(12) United States Patent
Miyamoto et al.

(10) Patent No.: US 7,117,969 B2
(45) Date of Patent: Oct. 10, 2006

(54) SUPPORT STRUCTURE FOR TRANSVERSAL ENGINE

(75) Inventors: Yasuo Miyamoto, Saitama (JP); Rainer Haas, Köln (DE)

(73) Assignee: Honda Motor Co., Ltd., Tokyo (JP)

(*) Notice: Subject to any disclaimer, the term of this patent is extended or adjusted under 35 U.S.C. 154(b) by 299 days.

(21) Appl. No.: 10/739,113

(22) Filed: Dec. 19, 2003

(65) Prior Publication Data

US 2004/0182631 A1 Sep. 23, 2004

(30) Foreign Application Priority Data

Dec. 25, 2002 (JP) ............................. 2002-375110

(51) Int. Cl.
*B60K 5/04* (2006.01)

(52) U.S. Cl. .................. 180/291; 180/300; 180/312; 267/140.11; 267/140.13

(58) Field of Classification Search .......... 180/291; 267/219, 140.11, 140.13; 244/54
See application file for complete search history.

(56) References Cited

U.S. PATENT DOCUMENTS

| | | | |
|---|---|---|---|
| 4,679,649 A | 7/1987 | Hoerig et al. | |
| 4,813,513 A | 3/1989 | Le Salver et al. | |
| 4,858,900 A | 8/1989 | Von Broock | |
| 5,035,296 A | 7/1991 | Sjostrand | |
| 5,039,073 A | 8/1991 | Reichard et al. | |
| 5,645,138 A * | 7/1997 | Tajima et al. ............... | 180/300 |
| 5,967,500 A * | 10/1999 | Satori et al. ............. | 267/140.13 |
| 6,131,893 A * | 10/2000 | Seynaeve et al. ........ | 267/140.13 |
| 6,250,615 B1 * | 6/2001 | Leibach .................. | 267/140.13 |
| 6,371,462 B1 * | 4/2002 | Gennesseaux .......... | 267/140.13 |
| 6,386,527 B1 * | 5/2002 | Oberle .................... | 267/140.14 |
| 6,435,487 B1 * | 8/2002 | Takaoka et al. ......... | 267/140.13 |

FOREIGN PATENT DOCUMENTS

| | | |
|---|---|---|
| EP | 1 151 886 A2 | 11/2001 |
| JP | 55-079715 | 6/1980 |
| JP | 56-079023 | 6/1981 |
| JP | 57-144126 | 9/1982 |
| JP | 63-61533 | 11/1988 |
| JP | 4-040733 | 2/1989 |
| JP | 2-45053 B2 | 10/1990 |
| JP | 3-5476 | 1/1991 |
| JP | 07-089356 | 4/1995 |
| JP | 2000-238542 | 9/2000 |
| WO | WO 02/055900 | 7/2002 |

OTHER PUBLICATIONS

Japanese Utility Model Laid-Open Publication No. 01-124441, filed Feb. 17, 1988 under Serial No. 63-19750.

* cited by examiner

*Primary Examiner*—Christopher P. Ellis
*Assistant Examiner*—John Walters
(74) *Attorney, Agent, or Firm*—Arent Fox PLLC

(57) ABSTRACT

A structure for supporting, via an engine mount, a transversal engine having a crankshaft laid horizontally at a right angle to a vehicle longitudinal axis, on a vehicle body, is disclosed. The engine mount includes at least one inclined hydro mount in which a working fluid is enclosed and a maximum damping generating axis is inclined a predetermined angle with respect to a vertical line. The inclined hydro mount is disposed inwardly of a total width in a power plant which includes the transversal engine and a transmission.

10 Claims, 16 Drawing Sheets

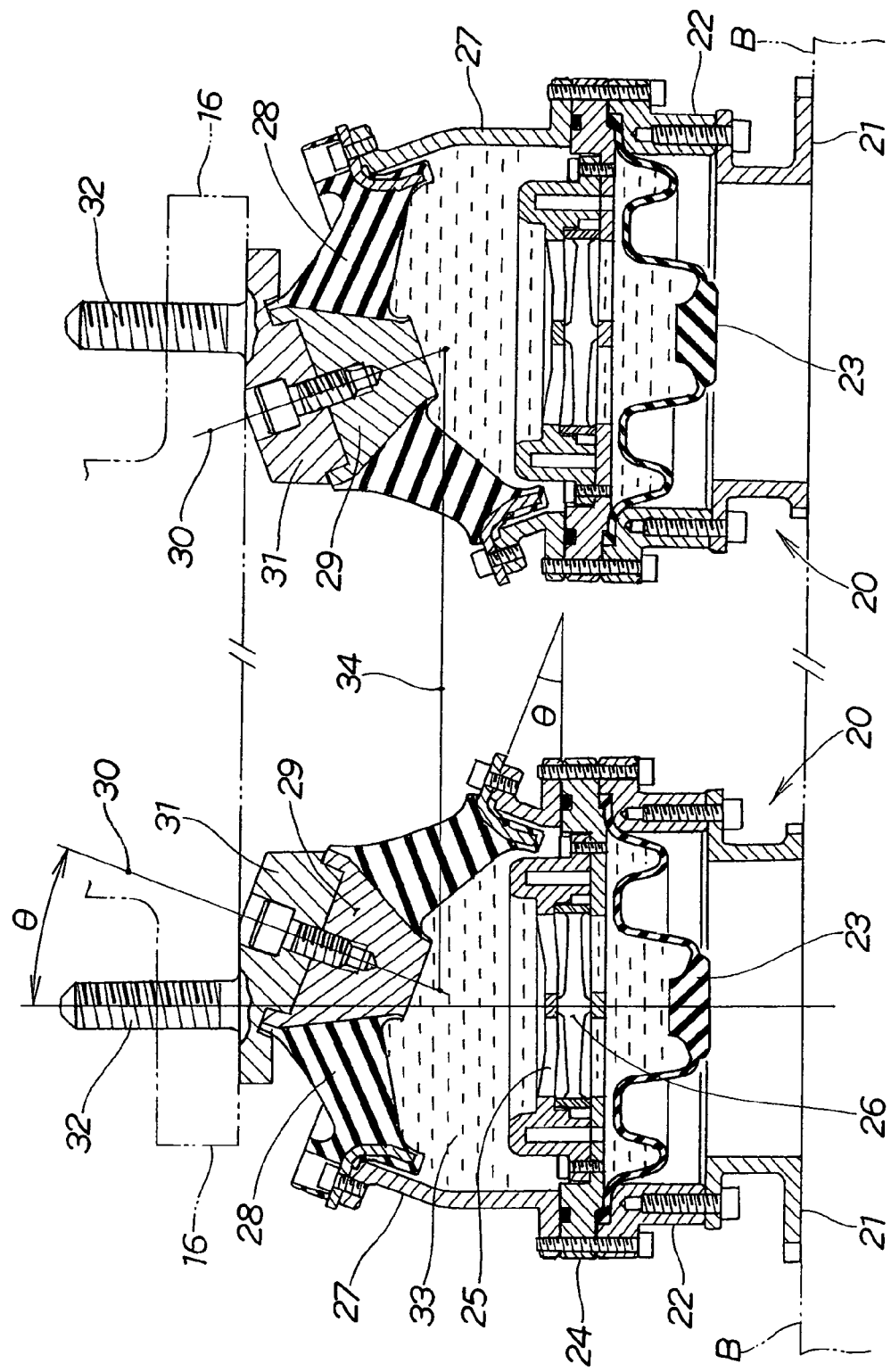

US 7,117,969 B2

SUPPORT STRUCTURE FOR TRANSVERSAL ENGINE

FIELD OF THE INVENTION

The present invention relates to an engine mount for supporting an engine with a crankshaft laid horizontally at a right angle to a vehicle longitudinal axis.

BACKGROUND OF THE INVENTION

Conventionally, as an engine mount for supporting an engine of a motor vehicle, there has been known a structure in which a liquid is sealingly enclosed, as disclosed in, for example, Japanese Patent Kokoku (Post-Exam) Publication No. SHO-63-61533.

The conventional engine mount will be discussed below with reference to FIG. 17 and FIG. 18 hereof.

In FIG. 17, reference numeral 101 denotes an upper plate, reference numeral 102 denotes a lower plate, reference numeral 103 denotes a bolt for connecting the upper plate 101 to the engine, reference numeral 104 denotes a bearing body fixed to a vehicle body frame, reference numerals 105 and 106 denote a rubber elastic body, reference symbol R1 denotes an upper liquid chamber, reference symbol R2 denotes a lower liquid chamber, and reference numeral 107 denotes an orifice doubling as a passage connecting the upper and lower liquid chambers R1 and R2. In the manner mentioned above, a mount structure provided with both of the rubber elastic bodies 105 and 106 and the liquid chambers R1 and R2 is called as a hydro mount.

When fixing the bearing body 104 and applying a vibration in a vertical direction to the upper plate 101 via the bolt 103, the liquid stored in the upper liquid chamber R1 moves to the lower liquid chamber R2 through the orifice 107, or the liquid in the lower liquid chamber R2 moves to the upper liquid chamber R1. At this time, a vibration energy applied to the liquid is attenuated through the orifice 107. The rubber elastic bodies 105 and 106 also serve as an elastic body so as to attenuate a part of the vibration energy.

Accordingly, the vibration energy caused by the vertical vibration is attenuated by the liquid and the rubber elastic body. This is a basic operation of the hydro mount.

In FIG. 18, reference symbol R3 denotes a left liquid chamber, reference symbol R4 denotes a right liquid chamber, reference numeral 108 denotes an outer ring, and reference numeral 109 denotes a communication pore formed in the rubber elastic body 105 in such a manner as to extend along an inner surface of the outer ring 108.

When fixing the bearing body 104 and applying a vibration in a lateral direction to the upper plate 101 via the bolt 103, the liquid stored in the left liquid chamber R3 moves to the right liquid chamber R4 through the transfer pore 109, or the liquid in the right liquid chamber R4 moves to the left liquid chamber R3. At this time, a vibration energy applied to the liquid is attenuated through the transfer pore 109. The rubber elastic bodies 105 and 106 also serve as an elastic body so as to attenuate a part of the vibration energy.

Since the hydro mount described in Publication No. SHO-63-61533 mentioned above attenuates not only the vertical vibration but also the lateral vibration, it is preferable for the engine mount. However, in order to form the left and right liquid chambers R3 and R4, and the transfer pore 109, a high degree of manufacturing technique is required. Further, since a shape is as a whole complex, an outer diameter is increased and a size is increased as a whole, in order to arrange the left and right liquid chambers R3 and R4 having a fixed volume.

In addition, since the transfer pore 109 is long, it is considered that a cross sectional area changes due to deterioration of rubber generated by a long term use or the like. When the cross sectional area changes, a throttling characteristic changes. Accordingly, the hydro mount of Publication No. SHO-63-61533 has a drawback in terms of durability.

SUMMARY OF THE INVENTION

The inventors of the present application have carried out investigations with a view to provide an engine mount which has similar size and structure to those of the conventional hydro mount but can attenuate vertical vibration and the longitudinal (or lateral) vibration and has increased durability. Through those investigations, the inventors have come to provide an inclined hydro mount which can attenuate a certain degree of longitudinal vibration by inclining a conical rubber in an upper portion of the hydro mount.

The inventors believe that the inclined hydro mount can make up a shortfall in the damping performance by contriving an arrangement of the inclined hydro mount with respect to the transversal engine, thereby preferably increasing the damping performance in comparison with the conventional one.

Then, to the above investigations, the inventors have added another investigation as to the arrangement or layout of the inclined hydro mount, believing that by devising its arrangement on the transversal engine, the inclined hydro mount could possibly have its limited damping performance improved over that of the conventional one. This has lead to the finding that a desired damping performance can be obtained by arranging, on the basis of a certain condition, the inclined hydro mount which is inexpensive and simple in structure.

According to an aspect of the present invention, there is provided a support structure for supporting, via an engine mount, a transversal engine having a crankshaft laid horizontally at a right angle to a vehicle longitudinal axis, on a vehicle body, characterized in that the engine mount includes at least one inclined hydro mount in which a working fluid is enclosed and a maximum damping generating axis is inclined a predetermined angle with respect to a vertical line, and the inclined hydro mount is disposed inwardly of a total width in a power plant which includes the transversal engine and a transmission.

Since at least one inclined hydro mount included in the engine mount has the maximum damping generating axis inclined with respect to the vertical line, the inclined liquid-sealed mount can attenuate a vertical amplitude and a longitudinal amplitude. The constituting material is not different so much from the conventional vertical type hydro mount, and therefore, it is possible to inhibit a manufacturing cost from being increased, and also to inhibit a size from being increased.

However, in order to compensate for a performance of the inclined hydro mount, the structure is made such that the mount is arranged in the inner side of the whole width in the power plant. It is considered that a longitudinal vibration acts on the inclined hydro mount in an aspect that a longitudinal parallel motion around a center of mass of the power plant (a forward and backward movement in parallel to the longitudinal axis of the vehicle body), and a yaw motion are combined. When arranging the inclined hydro mount in the inner side of the whole width in the power plant, the yaw motion can be made sufficiently small, and it is possible to increase the longitudinal parallel motion at that degree. In correspondence to the increase of the longitudinal parallel motion, the longitudinal amplitude applied to the inclined hydro mount becomes large. As a result, it is possible to sufficiently achieve the attenuation performance of the inclined hydro mount.

Owing to employment of the inclined hydro mount and contrive of the arranged position, it is the that the engine support structure preferable for the transversal engine can be provided.

Desirably, the inclined hydro mount is arranged at substantially the same height as a center of mass of the power plant.

If a difference in height exists between the center of mass of the power plant and the inclined hydro mount, there is generated a pitching moment of the engine having a magnitude in proportion to the difference in height, and a longitudinal displacement of the hydro mount is reduced. Then, the structure may be arranged such that the longitudinal force applied to the inclined hydro mount is made large by canceling the difference in height, whereby the attenuation force of the hydro mount can be achieved.

Preferably, the inclined hydro mount is plural, and an average value of heights of those inclined hydro mounts is substantially the same as the height of the center of mass of the power plant.

When the number of the inclined hydro mount is a plural number, it is not necessary to align all of the inclined mounts with the center of mass of the power plant, but it is sufficient to align the average value in height of all of the inclined mounts with the center of mass. This is because moments generated in correspondence to the difference in height are canceled with each other.

Further, since the individual inclined hydro mounts can comparatively freely select their levels, increased freedom of arrangement of the inclined hydro mount is provided.

In a preferred form, the inclined hydro mount is arranged on or near a vehicle longitudinal axis passing through the center of mass of the power plant as viewed in top plan.

It is considered that a longitudinal vibration acts on the inclined hydro mount in an aspect that a longitudinal parallel motion around a center of mass of the power plant, and a yaw motion are combined. When arranging the inclined hydro mount on or near the vehicle longitudinal axis passing through the center of mass of the power plant, the yaw motion approximates zero. This enables to efficiently transmit the longitudinal parallel motion of the engine to the hydro mount, and also to effectively achieve the attenuation performance of the inclined hydro mount.

The inclined hydro mounts may be arranged in right and left sides of the vehicle longitudinal axis passing through the center of mass of the power plant in a plan view, and a distance between the vehicle longitudinal axis and the left inclined hydro mount may be set to be substantially equal to a distance between the vehicle longitudinal axis and the right inclined hydro mount.

When the number of the inclined hydro mount is a plural number, it is not necessary to arrange all of the inclined mounts on or near the vehicle longitudinal axis passing through the center of mass of the power plant, but it is sufficient to align the distance between the vehicle longitudinal axis and the left inclined hydro mount with the distance between the vehicle longitudinal axis and the right inclined hydro mount. This is because right and left moments are canceled with each other.

Also, since it is possible to comparatively freely select the arrangement position in the lateral direction from the center of mass, increased freedom of arrangement of the inclined hydro mount is provided.

In a preferred form, the inclined hydro mounts are arranged in right and left sides of a vehicle cross axis passing through the center of mass of the power plant as viewed in side elevation, and those right and left inclined hydro mounts are arranged such that a maximum damping generating axes forms a V shape or an inverted-V shape.

The rubber is exposed to a repeated load, and bellies up due to a creep phenomenon if a heat is applied to the rubber from the engine. The inclined hydro mount inclines the conical rubber in the top portion. Due to the permanent strain, the top surface of the conical rubber moves longitudinally, that is, a forward or backward direction of the vehicle. As a result, a receiving surface of the inclined hydro mount displaces forward or backward, and the position of the horizontal engine changes. This change may trigger an increase of the vibration transmitted from the engine to the vehicle body.

In this point, since a pair of inclined hydro mounts are arranged in opposed relation to each other or back to back, it is possible to cancel the longitudinal movement and to prevent the problems from being generated.

It is desirable that the inclined hydro mount is inclined with respect to the vehicle longitudinal axis, and the angle of inclination is no less than 10 degrees.

The magnitude of the inclination angle determines a magnitude of the attenuation performance in the longitudinal direction of the inclined hydro mount. When the inclination angle becomes less than 10 degrees, the attenuation performance in the longitudinal direction becomes excessively small, so that it is necessary to set the inclination angle to be equal to or more than 10 degrees.

The inclination angle may be in a range between 15 degrees and 35 degrees.

If the inclination angle is equal to or more than 15 degrees, the attenuation performance in the longitudinal direction is increased. However, in accordance that the attenuation performance in the longitudinal direction is increased, the attenuation performance in the vertical direction is reduced. Accordingly, an upper limit of the inclination angle is set to 35 degrees.

When a component along the vehicle longitudinal axis in a resonance frequency of the power plant is called as a longitudinal resonance frequency of the power plant, a damping peak frequency of at least one inclined hydro mount may be set near the longitudinal resonance frequency of the power plant.

The vibrations in various kinds of frequency bands are applied to the engine mount. Among them, the longitudinal resonance frequency of the power plant is the most important frequency. It is effective for inhibiting the power plant from swinging longitudinally, thereby inhibiting the vehicle body from vibrating in the longitudinal direction to provide at least one inclined hydro mount which corresponds to the longitudinal resonance frequency mentioned above.

In a preferred form, a plurality of inclined hydro mounts are provided, a peak frequency of a first inclined hydro mount is set to be near the longitudinal resonance frequency of the power plant, and a damping peak frequency of a second inclined hydro mount is set to be at least 2 Hz higher than the first inclined hydro mount.

The reason why the damping peak frequency of the first inclined hydro mount is aligned with the longitudinal resonance frequency of the power plant is as mentioned above.

In the various kinds of vibrations applied to the engine mount, a non-suspended longitudinal resonance frequency applied to the engine mount from a tire wheel through a suspension is next important. This non-suspended longitudinal resonance frequency is ascertained to be 2 to 15 Hz higher than the longitudinal resonance frequency of the power plant by an actual measurement in the vehicle which is put to practical use. Accordingly, the peak frequency of the second inclined hydro mount is set to be at least 2 Hz higher than the first inclined hydro mount.

It is possible to correspond to both of the longitudinal resonance frequency of the power plant and the non-suspended longitudinal resonance frequency by a plurality of inclined hydro mounts, and riding comfort is further improved.

BRIEF DESCRIPTION OF THE DRAWINGS

Certain preferred embodiments of the present invention will be described in detail below, by way of example only, with reference to the accompanying drawings, in which:

FIG. 2A and FIG. 2B are cross sectional views illustrating a inclined hydro mount according to the present invention;

DETAILED DESCRIPTION OF THE PREFERRED EMBODIMENTS

First, since the present invention is on the assumption of a transversal engine, a description will be given first on the transversal engine, a description will be given next on a detailed structure of a hydro mount, and thereafter a description will be given thereafter as to an example arrangement of a hydro mount which is preferably for the transversal engine.

Figure 1A:
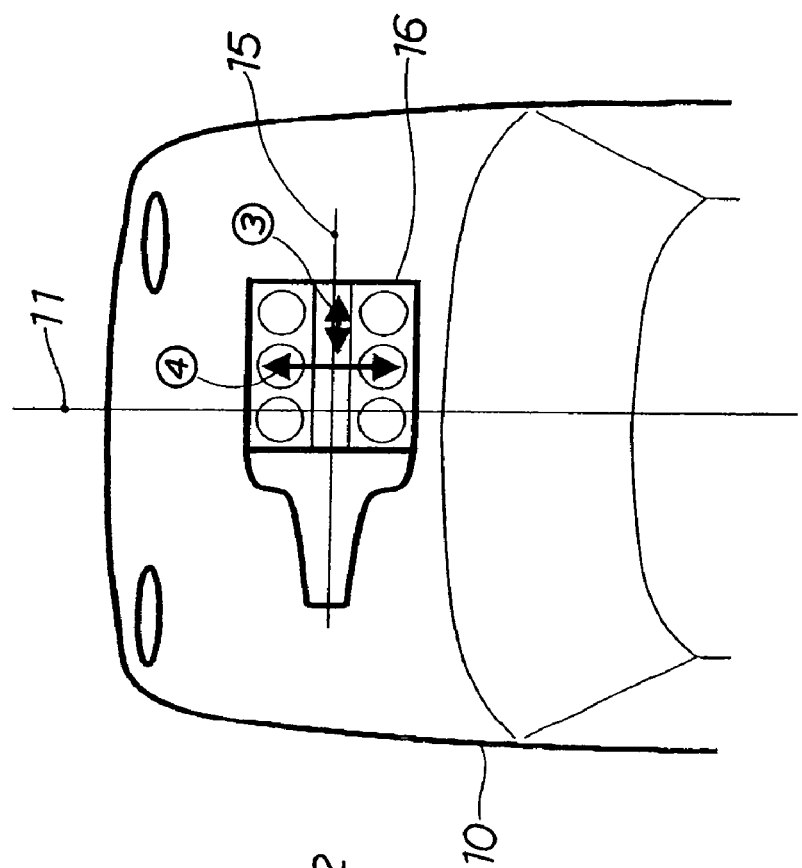
FIG. 1 is a schematic view illustrating a comparison between a longitudinal engine and a transversal engine.
Figure 1B:
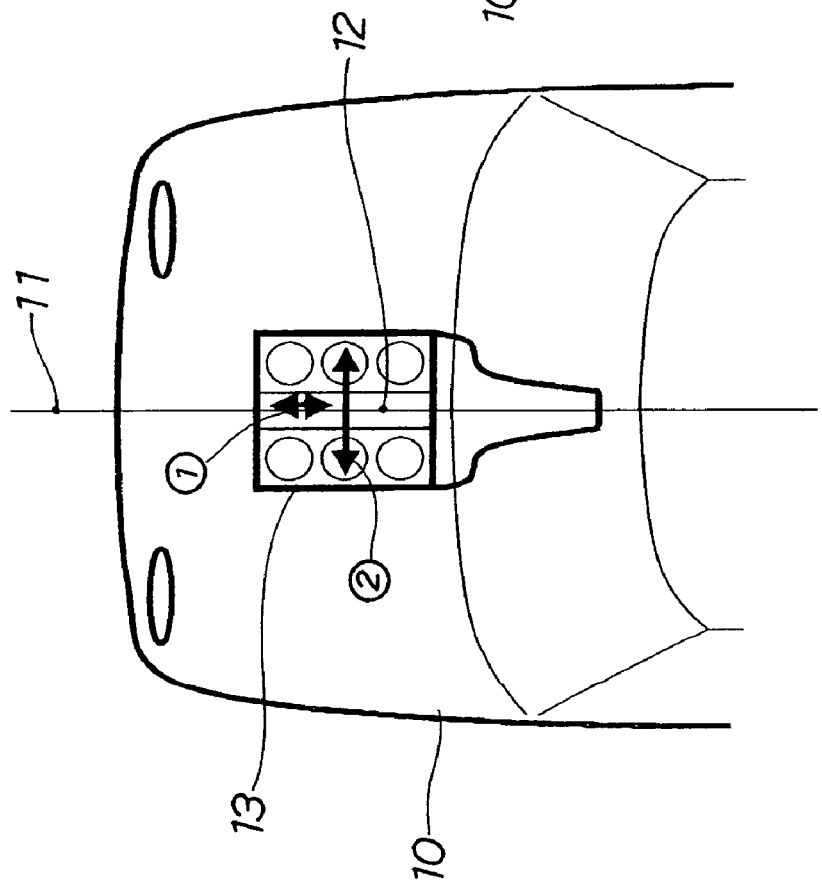

Reference is now made to FIGS. 1A and 1B which respectively illustrate schematically a vehicle 10 with a longitudinal engine and a transversal engine for comparison.

An engine arranged with a crankshaft 12 disposed in parallel to a vehicle longitudinal axis 11 is called a longitudinal engine 13. Due to a characteristic of a reciprocal engine, a vibration along the crankshaft 12 becomes small as shown by arrow ①, and a vibration in a direction orthogonal to the crankshaft 12 becomes great as shown by arrow ②.

That is, in the longitudinal engine 13, even when a spring constant of the engine mount in the vehicle longitudinal direction is set to be high, the deterioration of noise caused by the vibration is small, and thereby capable of increasing a spring constant in the vehicle longitudinal direction. By increasing the spring constant in the vehicle longitudinal direction, it is possible to inhibit the vehicle body from oscillating in the longitudinal direction due to a road surface reaction force.

It is well known that the human riding a vehicle traveling on the ground has an uncomfortable feeling against the body oscillating longitudinally.

Taking into consideration the characteristic of the human mentioned above, in the case of the vehicle provided with the longitudinal engine, the oscillation in the longitudinal direction of the vehicle body 13 is reduced, so that the oscillation is sufficiently acceptable for the passenger. Accordingly, in the longitudinal engine 13, it is not necessary to especially attenuate the longitudinal vibration in arrow ①, and it is said that a normal rubber mount and a normal hydro mount are sufficiently employed for the engine mount.

Turning now to FIG. 1B, the transversal engine is arranged such that a crankshaft 15 is directed perpendicularly to the vehicle longitudinal axis 11 is called as a transversal engine 16. In accordance with the characteristic of the reciprocal engine, a vibration along the crankshaft 15 is reduced as shown by arrow ③, and a vibration in a direction orthogonal to the crankshaft 15 is increased as shown by arrow ④.

That is, the transversal engine 16 greatly vibrates in the longitudinal direction of the vehicle 10. This vibration is transmitted to the vehicle body via an engine mount (not shown), and is transmitted to the passenger from the vehicle body in an aspect of sound and vibration. Therefore, it is impossible to set a spring constant of the engine mount in the longitudinal direction of the vehicle body high. In the case that it is impossible to increase the spring constant of the engine mount in the vehicle longitudinal direction, the oscillation in the longitudinal direction of the vehicle body is increased due to the road surface reaction force.

The human riding the vehicle traveling on the ground has an uncomfortable feeling against the longitudinal oscillation of the human body.

Thus, the transversal engine 16 requires a special engine mount which can attenuate even the longitudinal vibration as shown by arrow ④.

Discussion will be made next as to an embodiment of the special engine mount, the inclined hydro mount according to the present invention, with reference to FIGS. 2A and 2B.

Since FIG. 2B corresponds to a structure obtained by rotating a structure in FIG. 2A about a vertical axis 180 degrees, the structure in FIG. 2B is the same as that in FIG. 2A.

Referring to FIG. 2A, the inclined hydro mount 20 is constituted by a base metal fitting 21 which is connected to a side of a vehicle body B, a cylindrical metal fitting 22 which is mounted on the base metal fitting 21, a diaphragm 23 which is mounted on the cylindrical metal fitting 22, an intermediate plate 24 which presses an edge of the diaphragm 23 against the cylindrical metal fitting 22, an orifice 25 and a rubber plate 26 which are formed in the intermediate plate 24, an elbow metal fitting 27 which is mounted on the intermediate plate 24, a conical rubber 28 which is mounted on the elbow metal fitting 27, a center metal fitting 29 which is integrally dug into a center of the conical rubber 28, an attachment metal fitting 31 which is connected to the center metal fitting 29 by a bolt, a bolt 32 which is integrally formed in the attachment metal fitting 31, and a working fluid 33 which is sealed in an interior portion.

The elbow means a bent pipe, and the elbow metal fitting 22 is a bent pipe in which an angle θ formed by a bottom surface (a horizontal surface) and a top surface (an inclined surface) is about 20 degrees. Since the conical rubber 28, the center metal fitting 29 and the attachment metal fitting 31 are mounted to the top surface of the elbow metal fitting 22 mentioned above, a center line of the bolt 32 and a center line of the center metal fitting 29 form an angle θ.

When connecting the base metal fitting 21 to the vehicle body B, and mounting the engine 16 on the attachment metal fitting 31 so as to connect by using the bolt 32, the center line of the conical rubber 28 is inclined at the angle θ with respect to the vertical line (the center line of the bolt 32).

A maximum liquid movement is generated along the center line of the conical rubber 28. That is, the center line of the conical rubber 28 coincides with a maximum damping generation axis. Then, the center line of the conical rubber 28 is called as a "maximum damping generation axis 30". Since the maximum damping generation axis 30 is inclined at the angle θ, the inclined hydro mount 20 can bring out the attenuation performance in "vertical and longitudinal directions".

In the drawing, reference numeral 34 denotes a center line in height of the inclined liquid-sealed mount 20 passing through a center of elasticity in the conical rubber. In the case of arguing about the height of the inclined hydro mount 20, the height center line 34 is used.

Figure 3:
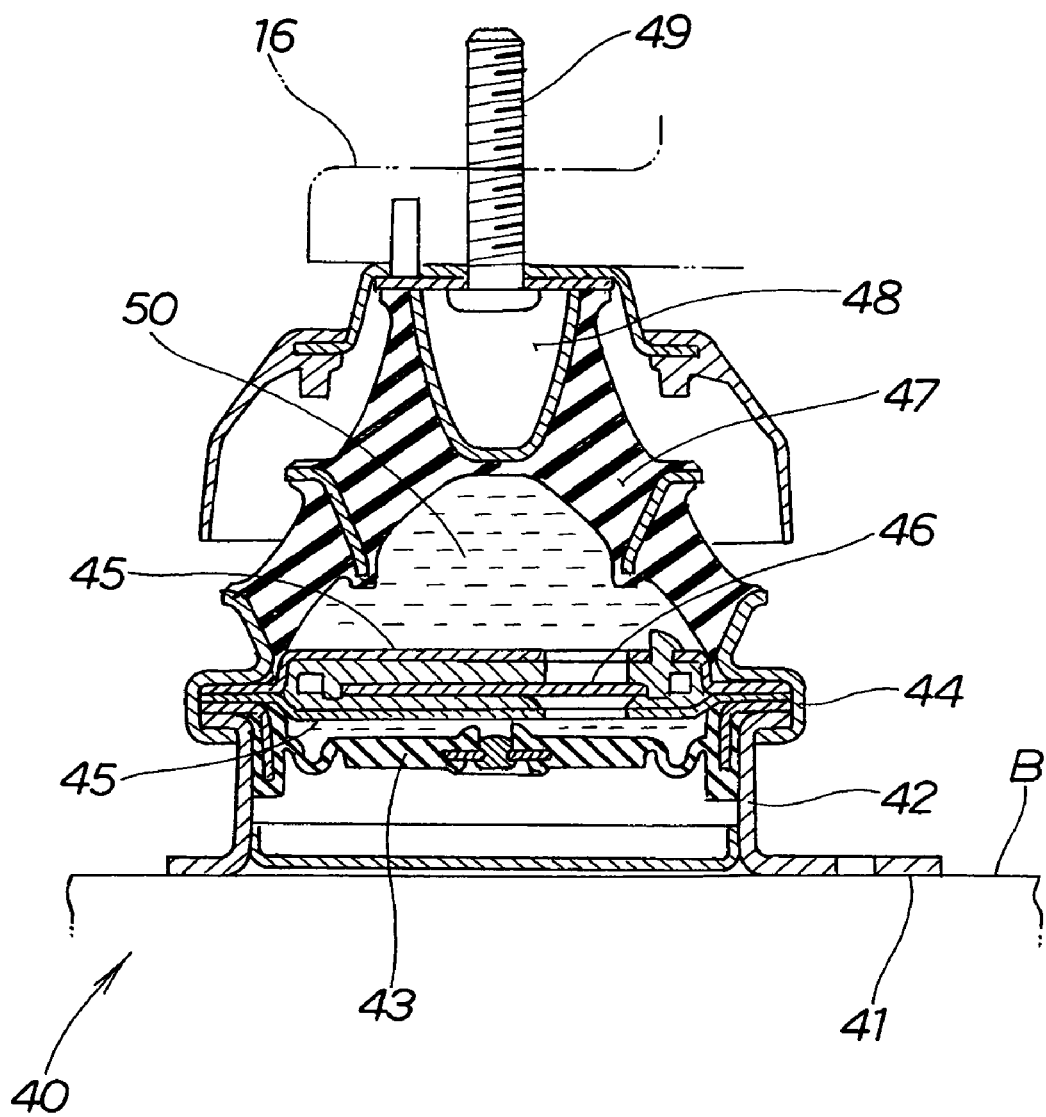
FIG. 3 is a cross sectional view of a vertical hydro mount.

Reference is now made to FIG. 3 illustrating in cross section a vertical type hydro mount. In a layout of the present invention, since there is a case that the normal vertical type hydro mount is used in combination with the inclined hydro mount, a description will be given of a structure thereof.

A vertical type hydro mount 40 is constituted by a base metal fitting 41 which is connected to the side of the vehicle body B, a cylindrical metal fitting 42 which is integrally formed on the base metal fitting 41, a diaphragm 43 which is mounted on the cylindrical metal fitting 42, a ring 44 which presses an edge of the diaphragm 43 against the cylindrical metal fitting 42, orifice plates 45 and 45 and a rubber plate 46 which are bridged over the ring 44, a conical rubber 47 which is mounted on the ring 44, a center metal fitting 48 which is integrally dug into a center of the conical rubber 47, a bolt 49 which is integrally formed in the center metal fitting 48, and a working fluid 50 which is sealed in an interior portion.

When connecting the base metal fitting 41 to the vehicle body B, and mounting the engine 16 on the center metal fitting 47 so as to connect by using the bolt 48, it is possible to attenuate the "vertical oscillation".

Next, a description will be given of an example arrangement of the engine mount. In the present invention, the engine mount employs a combination of three kinds of mount elements comprising the inclined hydro mount 20 mentioned with reference to FIGS. 2A and 2B, the vertical type hydro mount 40 mentioned with reference to FIG. 3, and a rubber mount. In this case, since the rubber mount is a general purpose part, a detailed description of the structure is omitted. The structure is made such that an elastic rubber is a main component, no liquid is sealed therein, and an attenuation performance is about one tenth in comparison with the vertical type hydro mount 40.

Figure 4A:
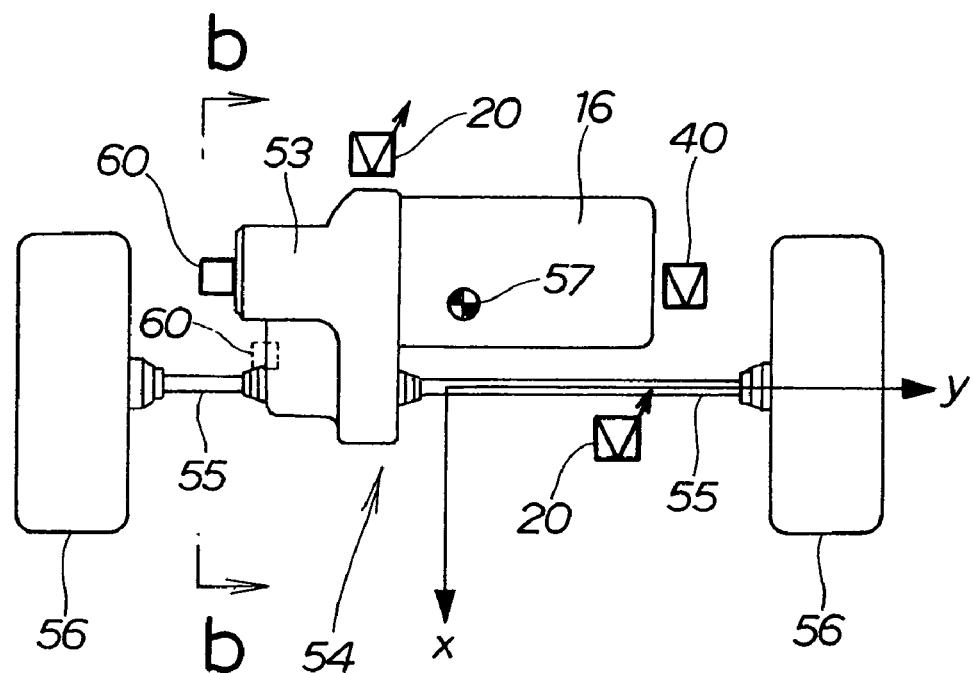
FIG. 4A and FIG. 4B are schematic views illustrating an engine mount for a transversal engine, according to a first embodiment of the present invention.
Figure 4B:
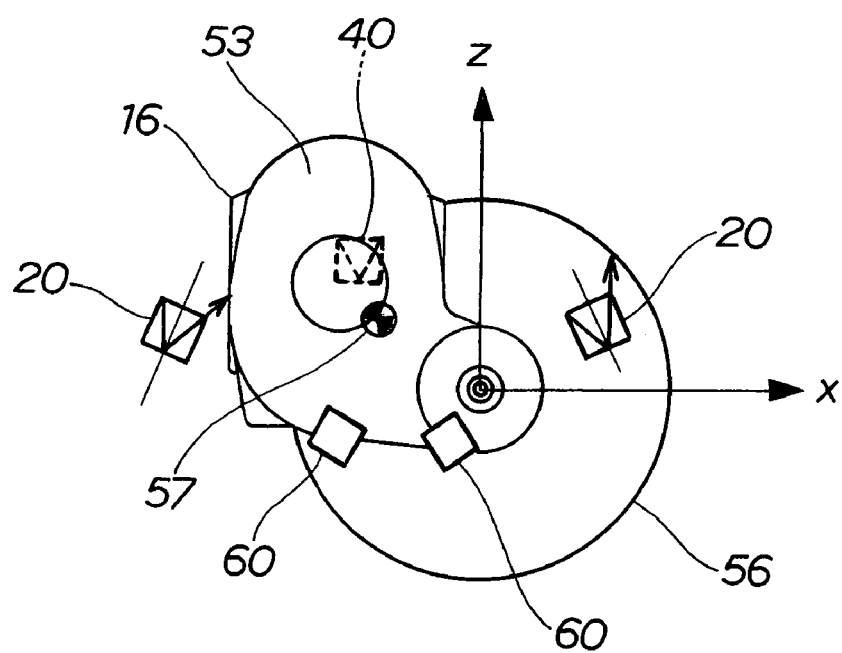

In FIGS. 4A and 4B and Figures that follow, the inclined hydro mount 20 is represented by a symbol of V-in-square and arrow protruding obliquely from upper right corner. The vertical type hydro mount 40 is represented by a V-in-square symbol. A rubber mount 60 is represented by a square symbol. Further, in those drawings, reference character x denotes a rear side of the vehicle; reference character y denotes a right side of the vehicle; and reference character z denotes an upper side of the vehicle.

Now, reference is made to FIG. 4A illustrating in top plan the transversal engine mount according to a first embodiment of the present invention and FIG. 4B illustrating the engine mount as viewed in the direction of arrows b—b.

In FIG. 4A, reference numeral 16 denotes a transversal engine, reference numeral 53 denotes a transmission which is attached to the engine 16, reference numeral 54 denotes a power plant which is obtained by combining the engine 16 and the transmission 53, reference numerals 55 and 55 denote drive shafts, reference numerals 56 and 56 denote drive wheels, and reference numeral 57 denotes a center of mass of the power plant 54.

That is, there is shown a well known structure which changes a power generated in the transversal engine 16 so as to transmit to the drive wheels 56 and 56 via the drive shafts 55 and 55.

Then, two inclined hydro mounts 20 and 20, one vertical type hydro mount 40 and two rubber mounts 60 and 60 are arranged in such a manner as to surround the power plant 54.

As shown in FIG. 4B, the rubber mounts 60 and 60 support the transmission 53.

Figure 5A:
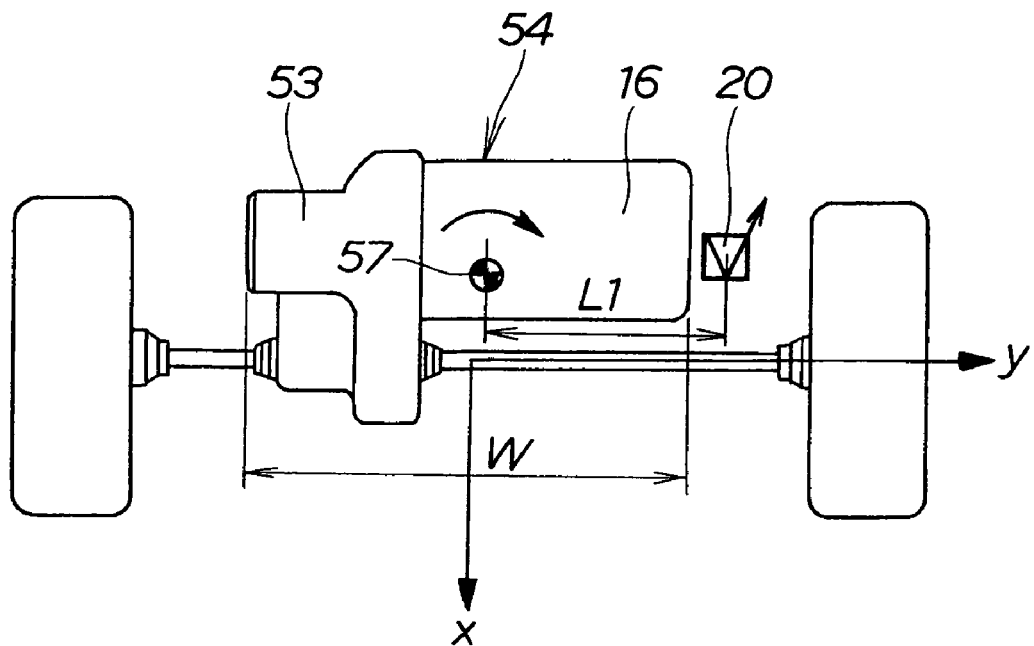
FIG. 5A and FIG. 5B are schematic views illustrating an operation of the first embodiment.

Next, reference is made to FIG. 5A illustrating a comparative example and 5B illustrating the first embodiment.

In FIG. 5A, the inclined hydro mount 20 is arranged in an outer side of a whole width W of the power plant 54. A longitudinal vibration (a vibration in the X direction) of the power plant 54 is considered to be applied to the inclined hydro mount 20 according to an aspect that a longitudinal parallel motion and a yaw motion are combined around the center of mass 57.

In accordance that a distance L1 in a lateral direction from the center of mass 57 to the inclined hydro mount 20 is large, the yaw motion is increased, and the longitudinal parallel motion is inversely reduced. Since a displacement in the longitudinal direction in the inclined hydro mount 20 is reduced in correspondence to the reduction of the longitudinal parallel motion, it is impossible to sufficiently bring out the attenuation capacity by the hydro mount 20.

Figure 5B:
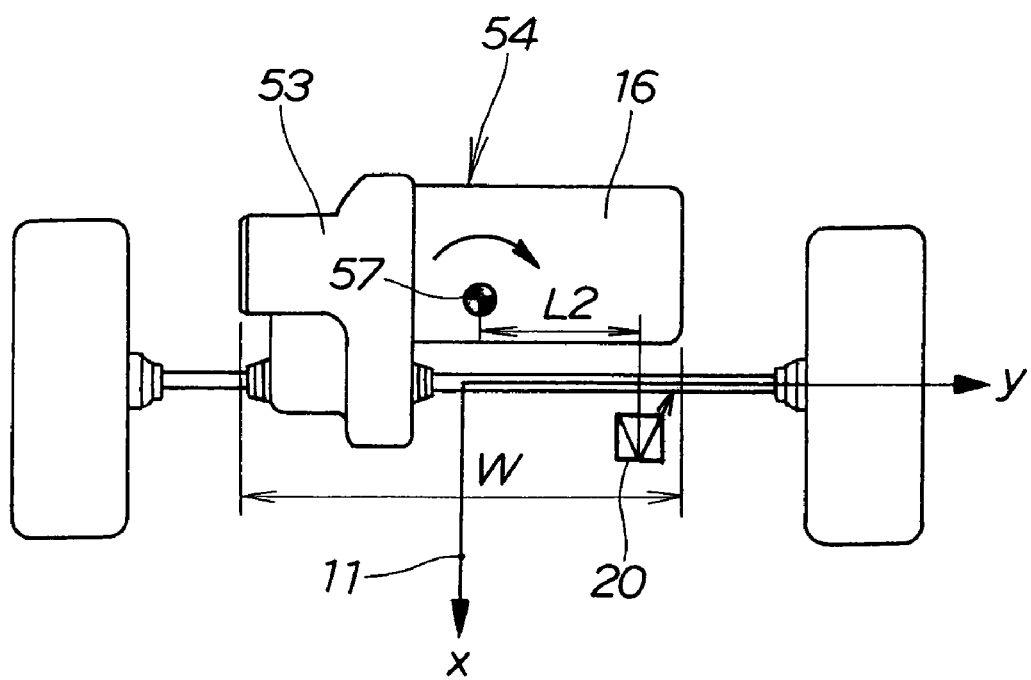

In FIG. 5B, a distance L2 in the lateral direction from the center of mass 57 to the inclined mount 20 is reduced. That is, at least one inclined hydro mount 20 is arranged inside the whole width of the power plant 54. Accordingly, the distance L2 becomes small, the displacement in the longitudinal direction in the inclined hydro mount 20 is increased, and an amount of attenuation is increased.

Since the inclined hydro mount 20 attenuates mainly the vertical vibration and has a small attenuation capacity with respect to the longitudinal vibration, it is possible to bring out an effect of encouraging adoption of the inclined hydro mount 20 by making the distance L2 small and increasing the displacement in the longitudinal direction.

That is, according to the first embodiment, there is provided the support structure for the transversal engine which supports the transversal engine 16 arranged such that the crankshaft is directed perpendicular to the vehicle longitudinal axis 11 and horizontally to the side of the vehicle body via the engine mount, characterized in that the engine mount includes at least one inclined hydro mount 20 in which the working fluid is sealed and the maximum damping generation axis is inclined at a predetermined angle with respect to the vertical line, and the inclined hydro mount 20 is arranged inside the whole width W of the power plant 54 including the transversal engine 16 and the transmission 53.

Turning back to FIG. 2, since at least one inclined hydro mount 20 included in the engine mount is structured such that the maximum damping axis 30 is inclined at θ with respect to the vertical line, it is possible to attenuate the vertical amplitude and the longitudinal amplitude. The constituting material is not different from the conventional vertical type hydro mount 40 shown in FIG. 3 so much, and thereby it is possible to restrict an increase of manufacturing cost, and also to inhibit an increase of size.

In addition, in order to cover the performance of the inclined hydro mount 20, the mount 20 is arranged inside the whole width W of the power plant 54 as shown in FIG. 5B.

It is considered that the longitudinal vibration is applied to the inclined hydro mount 20 in an aspect that the longitudinal parallel motion and the yaw motion around the center of mass 57 of the power plant 54 are combined.

When arranging the hydro mount 20 inside the whole width W of the power plant 54, the yaw motion can be made sufficiently small, and the longitudinal parallel motion becomes large, so that the longitudinal vibration applied to the inclined hydro mount 20 becomes large, and it is possible to sufficiently bring out the attenuation capacity of the inclined hydro mount 20.

It is said that the engine support structure preferable for the transversal engine 16 can be provided by adopting the inclined hydro mount 20 and contriving the arranged position.

Figure 6A:
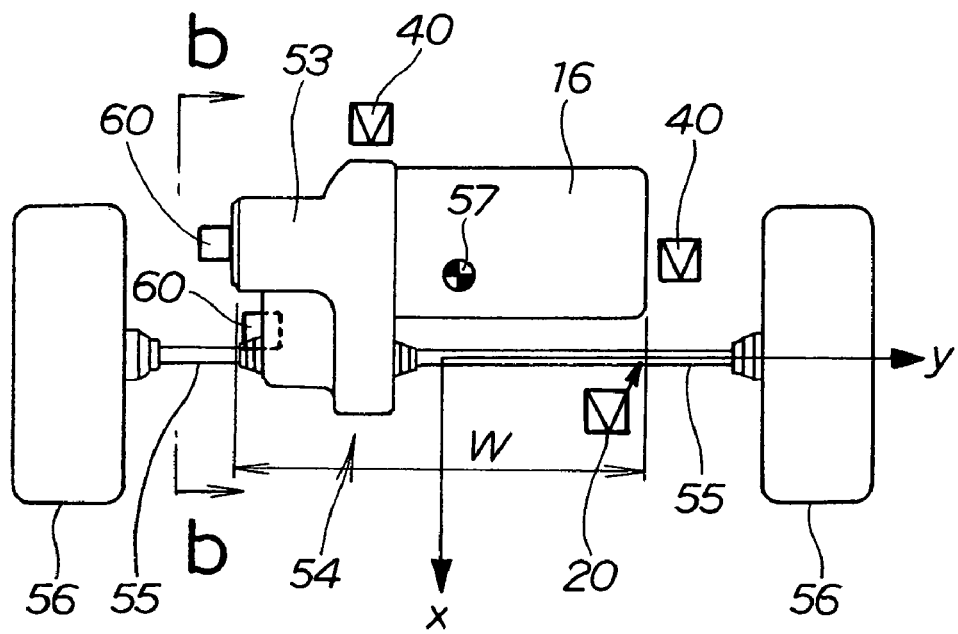
FIG. 6A and FIG. 6B are schematic views illustrating an engine mount for a transversal engine, according to a second embodiment of the present invention.
Figure 6B:
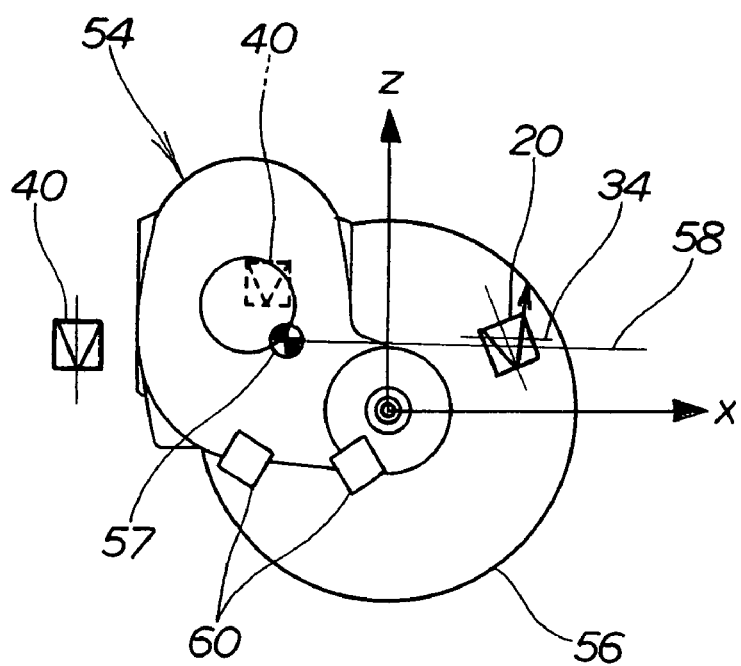

Reference is now made to FIG. 6A illustrating in top plan a transversal engine mount according to a second embodiment of the present invention, and FIG. 6B illustrating the engine mount as viewed in the direction of arrows b—b. Since reference numerals used in these Figures are the same as those used in FIGS. 4A and 4B, description thereof will be omitted.

As shown in FIG. 6A, the inclined hydro mount 20 is arranged in a rear side of the power plant 54 and inside the whole width W. The vertical type hydro mount 40 is arranged in front of the power plant 54.

Further, as shown in FIG. 6B, the height of the inclined hydro mount 20 is determined in such a manner as to substantially coincide with a level line 58 passing through the center of mass 57 of the power plant 54. The height center line of the inclined hydro mount 20 is the one designated by numeral 34 in FIG. 2. The center line 34 is made consistent with or close to the level line 58.

Figure 7A:
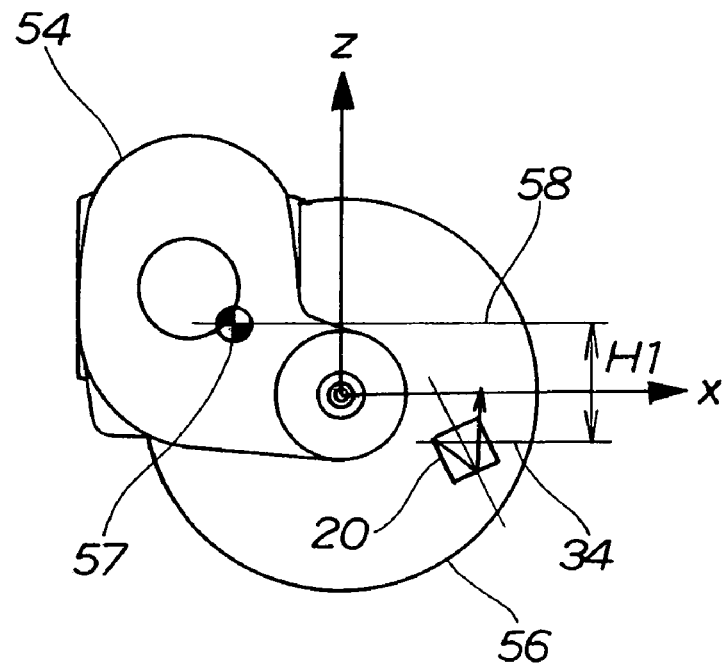
FIG. 7A and FIG. 7B are schematic view illustrating an operation of the second embodiment.
Figure 7B:
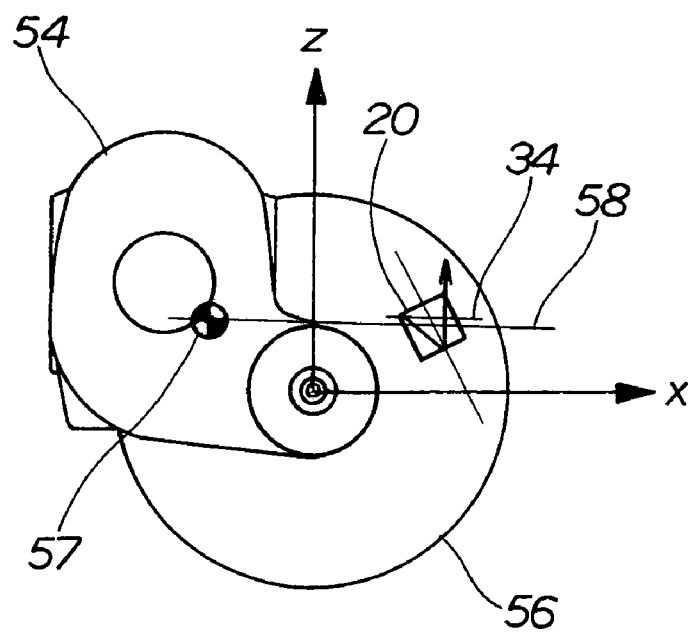

Now, reference is made to FIGS. 7A and 7B illustrating an operation of the second embodiment. More specifically, FIG. 7A shows in top plan a comparative example while FIG. 7B shows the embodiment.

As shown in FIG. 7A, the example inclined hydro mount 20 is arranged at a position a distance H1 lower than the center of mass 57. The longitudinal vibration (vibration in the direction of x axis) in the center of mass 57 becomes a greater moment in correspondence to an increase of the distance H1 so as to be applied to the inclined hydro mount 20. It is considered that the power plant 54 rotates around the inclined hydro mount 20 corresponding to a supporting point, due to existence of the inclined hydro mount 20.

In FIG. 7B, since the level of the inclined hydro mount 20 is aligned with the level of the center of mass 57, it is possible to purely burden the inclined hydro mount 20 with the longitudinal vibration. Due to the existence of the inclined hydro mount 20, the power plant 54 does not rotate around the inclined hydro mount 20 corresponding to a supporting point.

That is, in the second embodiment, the inclined hydro mount 20 is characterized in that the inclined hydro mount 20 is arranged at substantially the same height as the center of mass 57 of the power plant 54.

In the case that the level in height exists between the center of mass 57 of the power plant 54 and the inclined hydro mount 20, the longitudinal force having a magnitude in proportion to the level in height is applied to the inclined hydro mount 20.

Then, in the second embodiment, the longitudinal force applied to the inclined hydro mount 20 is increased by canceling the difference in height, thereby bringing out the attenuation capacity of the hydro mount.

Figure 8A:
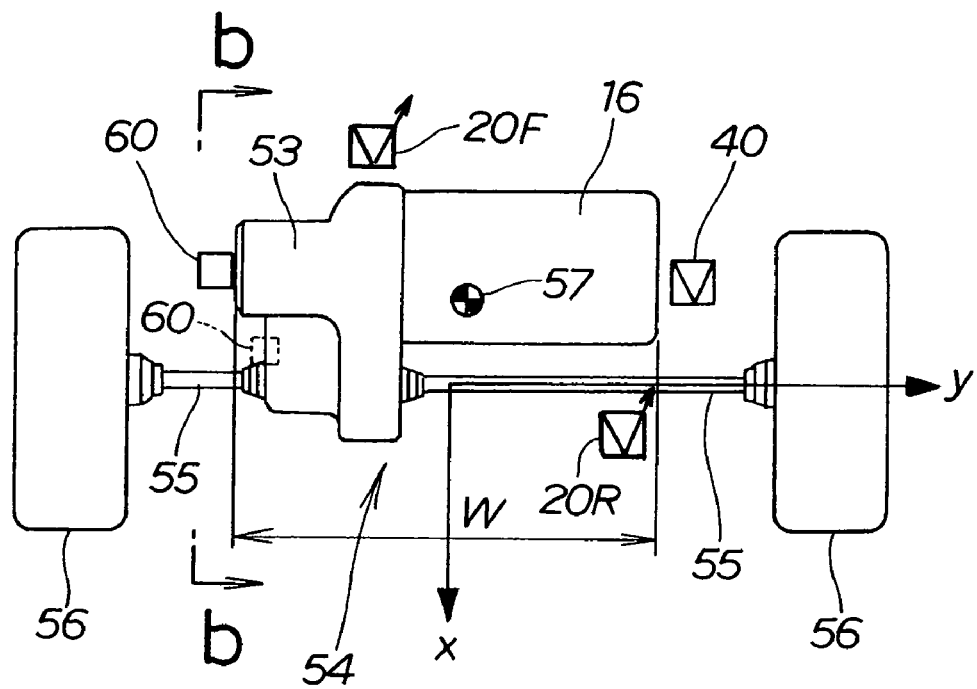
FIG. 8A and FIG. 8B are schematic views illustrating an engine mount for a transversal engine, according to a third embodiment of the present invention.
Figure 8B:
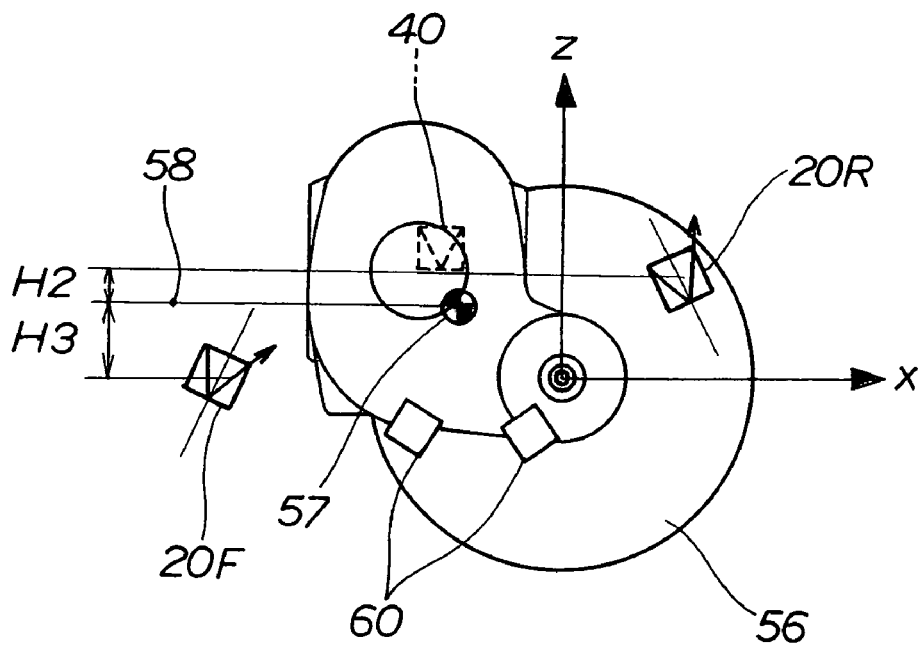

Next, reference is made to FIG. 8A illustrating in top plan an engine mount for the transversal engine, according to a third embodiment of the present invention, and FIG. 8B illustrating the engine mount as viewed in the direction of arrows b—b of FIG. 8A.

As shown in FIG. 8A, inclined hydro mounts 20F and 20R are arranged in front and rear sides of the power plant 54. These inclined hydro mounts 20F and 20R are both arranged inside the whole width W of the power plant 53.

As shown in FIG. 8B, the rear inclined hydro mount 20R is arranged H2 above the center of mass 57, and the front inclined hydro mount 20F is arranged H3 below the center of mass 57.

In the case that the distance H2 is substantially equal to the distance H3, the moments can be cancelled, and it is possible to purely burden the inclined hydro mounts 20F and 20R with the longitudinal vibration.

That is, the third embodiment is characterized in that a plurality of inclined hydro mounts 20F and 20R are provided, and an average value in height of these inclined hydro mounts 20F and 20R is substantially equal to the height of the center of mass 57 in the power plant 54.

In the case that the number of the inclined hydro mounts is a plural number, it is not necessary to align all of the inclined mounts with the level of the center of mass of the power plant, and it is sufficient that the average value in height of all the inclined mounts is aligned with the lever of the center of mass. This is because the moments generating in accordance with the difference in height are canceled with each other.

According to the third embodiment, since the individual inclined hydro mounts can comparatively freely select the level, a freedom in arrangement of the inclined hydro mounts is increased.

Figure 9A:
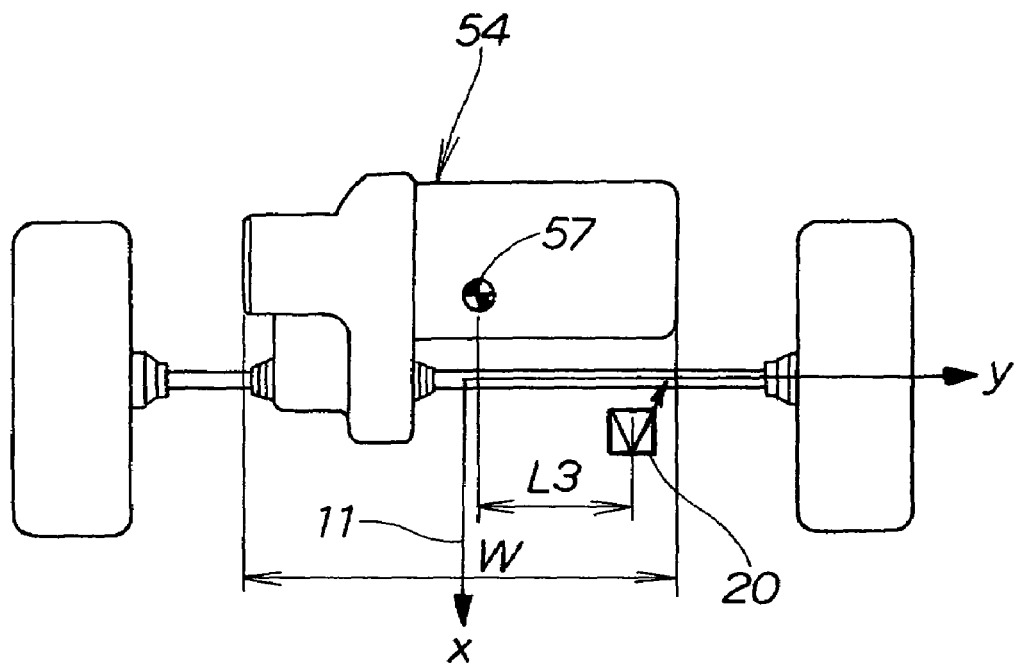
FIG. 9A and FIG. 9B are schematic views illustrating an engine mount for a transversal engine, according to a fourth embodiment of the present invention.
Figure 9B:
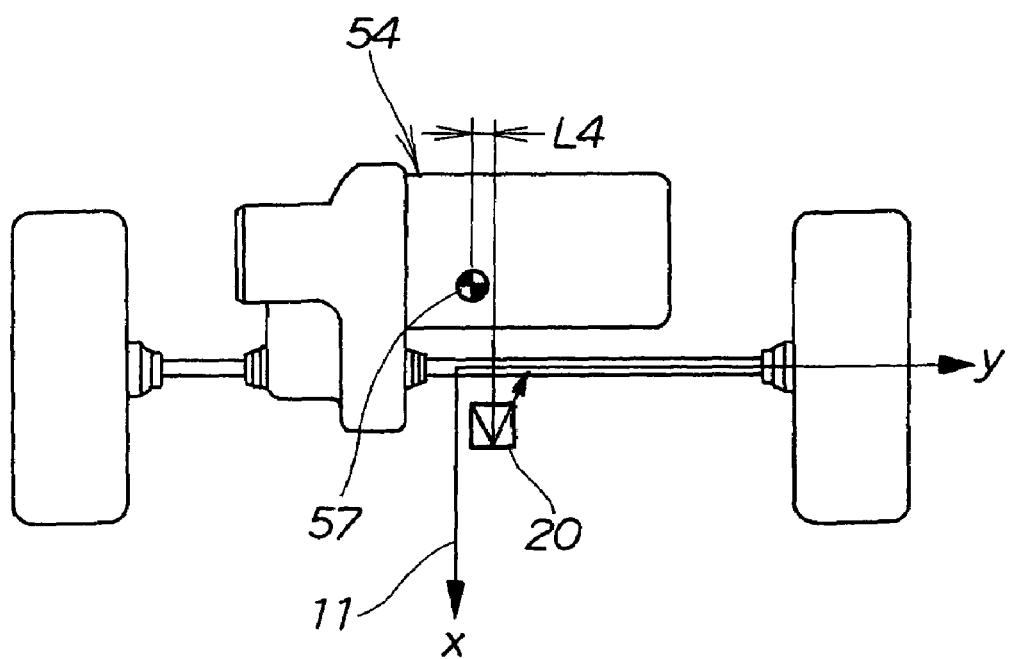

Reference is made next to FIG. 9A illustrating in top plan a comparative example of n engine mount for the transversal engine, and FIG. 9B illustrating in top plan an engine mount for the transversal engine, according to a fourth embodiment of the present invention.

FIG. 9A is a view similar to FIG. 5B. The inclined hydro mount 20 exists inside the whole width W of the power plant 54, however, a distance L3 in a lateral direction to the center of mass 57 is large to the extent similar to one half of the whole width W. Although it is an allowable size, a great yaw motion in proportion to the distance L3 is generated, and the less longitudinal vibration is applied to the inclined hydro mount 20. Accordingly, it is impossible to bring out the sufficient damping capacity.

In FIG. 9B, the inclined hydro mount 20 is arranged so as to make a distance L4 in the lateral direction from the center of mass 57 to the inclined hydro mount 20 close to zero. In comparison with FIG. 9A, the input in the longitudinal direction becomes greater in the inclined hydro mount 20, it is possible to bring out the great attenuation, and to reduce the vibration of the engine.

That is, the fourth embodiment is characterized in that the inclined hydro mount 20 is arranged on or near the vehicle longitudinal axis 11 passing through the center of mass 57 of the power plant 54 in a plan view.

It can be considered that the longitudinal vibration is applied to the inclined hydro mount in an aspect that the longitudinal parallel motion and the yaw motion are combined around the center of mass of the power plant. When arranging the inclined hydro mount on or near the vehicle longitudinal axis passing through the center of mass of the power plant, the yaw motion comes similar to zero, it is possible to efficiently transmit the longitudinal parallel motion of the engine to the hydro mount, and also to effectively bring out the attenuation performance of the inclined hydro mount.

However, in view of the layout, there is a case that it is hard to place the inclined hydro mount 20 on or near the vehicle longitudinal axis 11 passing through the center of mass 57 of the power plant 54 in accordance with a relation of clearance with respect to an exhaust manifold, a body, a sub frame or a transmission case. At that time, the next embodiment is effective.

Figure 10A:
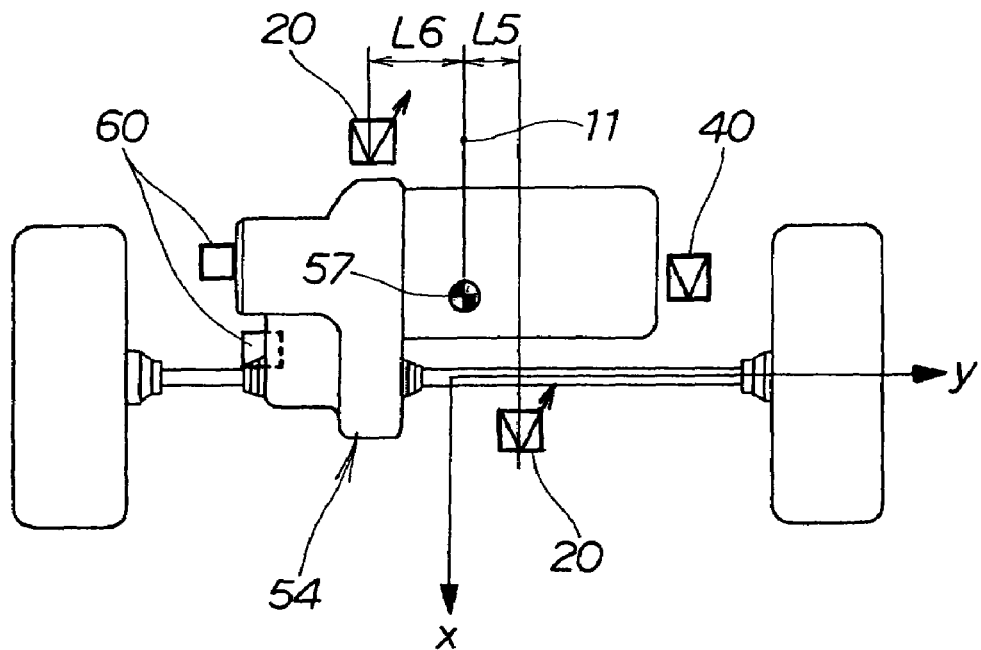
FIG. 10A and FIG. 10B are schematic views illustrating an engine mount for a transversal engine, according to a fifth embodiment of the present invention.
Figure 10B:
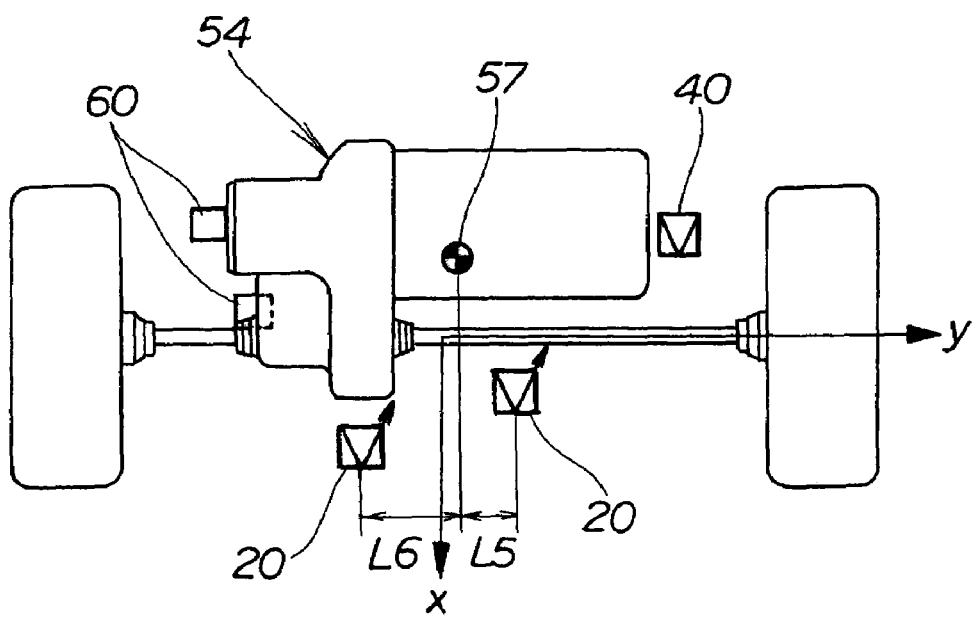

FIGS. 10A and 10B are views of an engine mount for the transversal engine, according to a fifth embodiment of the present invention.

In both of FIGS. 10A and 10B, the inclined hydro mounts 20 and 20 are arranged in right and left sides around the center of mass 57, and distances L5 and L6 in the lateral direction from the center of mass 57 to the right and left inclined hydro mounts 20 and 20 are set substantially the same. By setting substantially the same, right and left yaw motions which are expected to be generated around the right and left engine mounts corresponding to the supporting points are canceled. Thus, it is possible to obtain the same effect as that of the case of placing the inclined hydro mount 20 on or near the vehicle longitudinal axis 11 passing through the center of mass 57.

That is, the fifth embodiment is characterized in that the inclined hydro mounts are arranged in the right and left sides of the vehicle longitudinal axis passing through the center of mass of the power plant in a plan view, and the distance from the vehicle longitudinal axis to the left inclined hydro mount is set substantially the same as the distance from the vehicle longitudinal axis to the right inclined hydro mount.

When the number of the inclined hydro mounts is a plural number, it is not necessary to arrange all of the inclined mounts on or near the vehicle longitudinal axis passing through the center of mass of the power plant, but it is sufficient to align the distance from the vehicle longitudinal axis to the left inclined hydro mount with the distance from the vehicle longitudinal axis to the right inclined hydro mount. This is because the right and left moments are canceled.

According to the fifth embodiment, since it is possible to comparatively freely select the arranged position in the lateral direction from the center of mass, a freedom of arrangement of the inclined hydro mount can be increased.

Figure 11A:
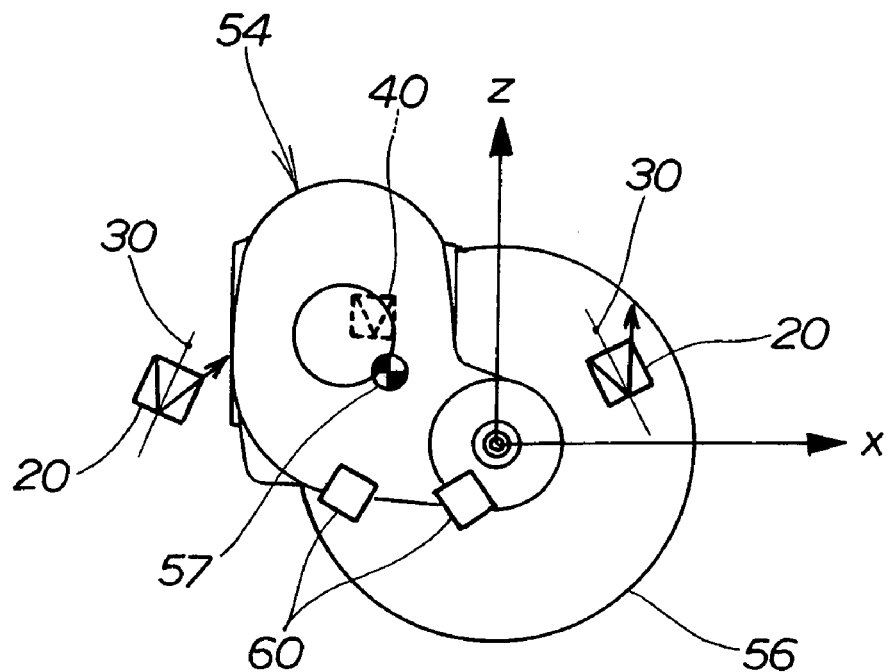
FIG. 11A and FIG. 11B are schematic views illustrating an engine mount for a transversal engine, according to a sixth embodiment of the present invention.
Figure 11B:
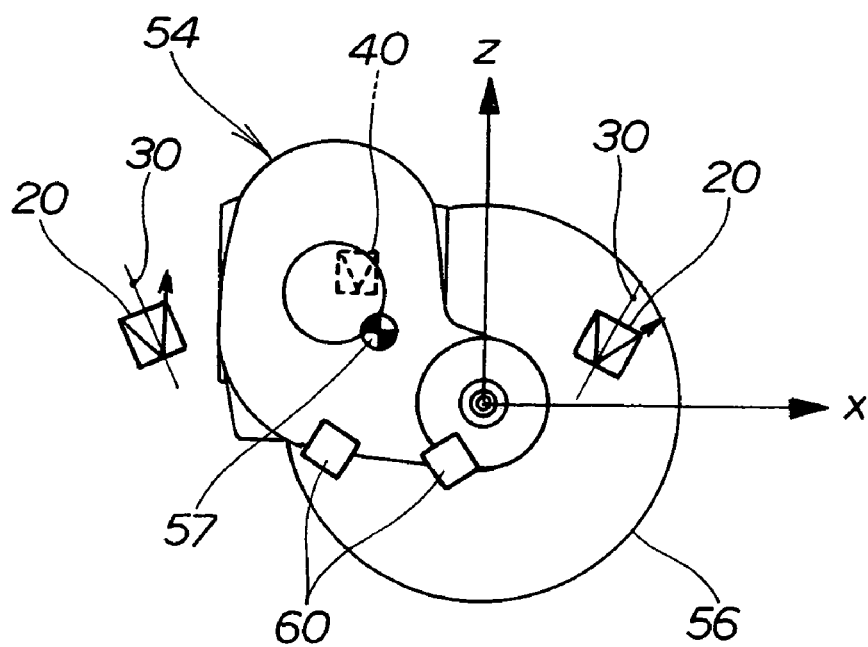

Reference is made next to FIGS. 11A and 11B illustrating an engine mount for the transversal engine, according to a sixth embodiment of the present invention.

In FIG. 11A, the inclined hydro mounts 20 and 20 are arranged in the front and rear sides of the power plant 54 in such a manner as to describe an inverted-V shape.

In FIG. 11B, the inclined hydro mounts 20 and 20 are arranged in the front and rear sides of the power plant 54 in such a manner as to describe a V shape.

Figure 12A:
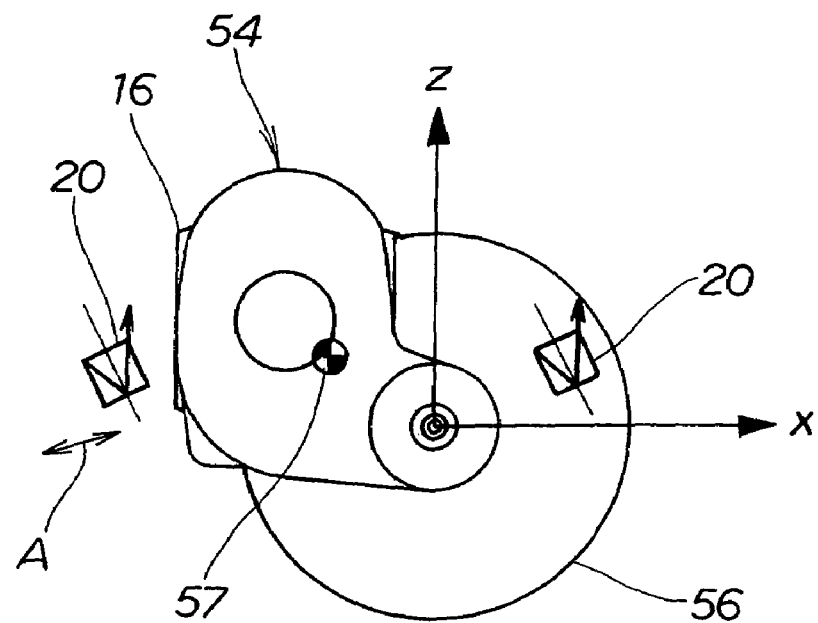
FIG. 12A and FIG. 12B are schematic views iluustrating an operation of the sixth embodiment.
Figure 12B:
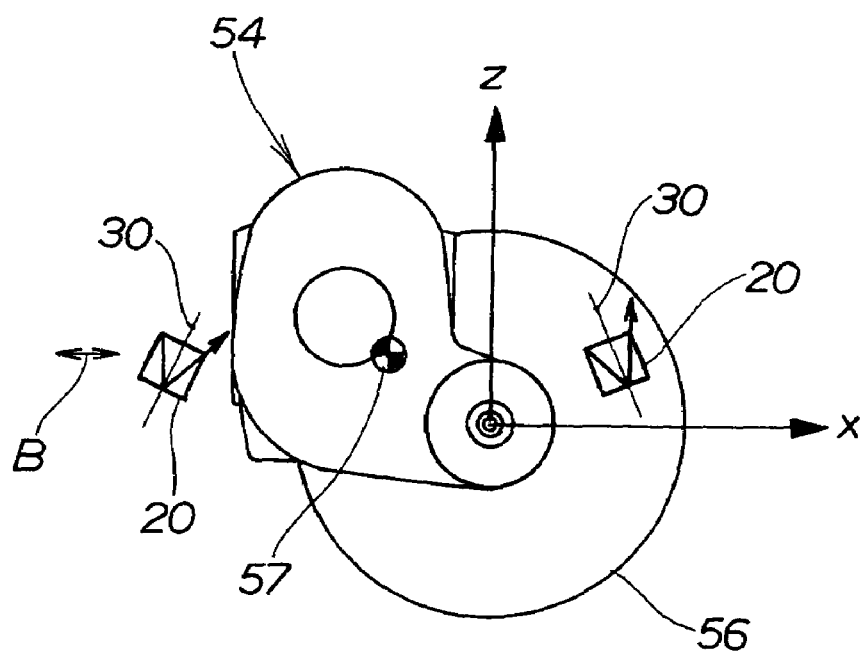

Next, discussion will be made as to an operation of an engine mount for the transversal engine, according to a sixth embodiment of the present invention, with reference to FIG. 12A illustrating an engine mount as a comparative example and FIG. 12B illustrating the engine mount according to the sixth embodiment.

In the comparative example of FIG. 12A, both of the front and rear inclined hydro mounts 20 and 20 are inclined so as to ascend forward. As a result, the longitudinal vibration of the power plant 54 is generated so as to descend forward as shown by an arrow A. In the case that the conical rubber included in the inclined hydro mounts 20 and 20 bellies up, the power plant 54 is permanently shifted forward at a little amount, and the crankshaft of the engine 16 is shifted forward. It is not preferable on a vibration countermeasure that the power plant is shifted forward or rearward from a predetermined position.

In this view, in accordance with the structure in FIG. 12B, since a pair of inclined hydro mounts 20 and 20 are arranged in an opposing manner, the permanent strains of the conical rubbers are canceled, so that the power plant 54 is not permanently shifted forward or rearward.

That is, the sixth embodiment is characterized in that the inclined hydro mounts 20 and 20 are arranged in the front and rear sides (the right and left sides on the drawing) of a vehicle cross axis passing through the center of mass 57 of the power plant 54 (an axis extending in a front and tail direction passing through a point 57) in a plan view as shown in FIG. 12B, and the front and left inclined hydro mounts 20 and 20 are arranged so that the maximum damping generation axes 30 and 30 form the V shape or the inverted-V shape.

When repeated loads are applied to the rubber and heat from the engine is applied thereto, the rubber bellies up in accordance with a creep phenomenon. In the inclined hydro mount, the conical rubber in the top portion is inclined. Due to the permanent strain mentioned above, the top surface of the conical rubber moves longitudinally, that is, the forward or rearward direction of the vehicle at a little amount. As a result, a bearing surface of the inclined hydro mount displaces in the front side or the rear side, and the position of the transversal engine is changed. There is a possibility that this change introduces an increase of vibration transmission from the engine to the vehicle body.

In this view, according to the sixth embodiment, since a pair of inclined hydro mounts are arranged in an opposing manner or back to back, it is possible to cancel the forward and backward movements, which enables to prevent problems from being generated.

Next, a description will be given of an attenuation property of the inclined hydro mount 20 according to the present invention.

Figure 13:
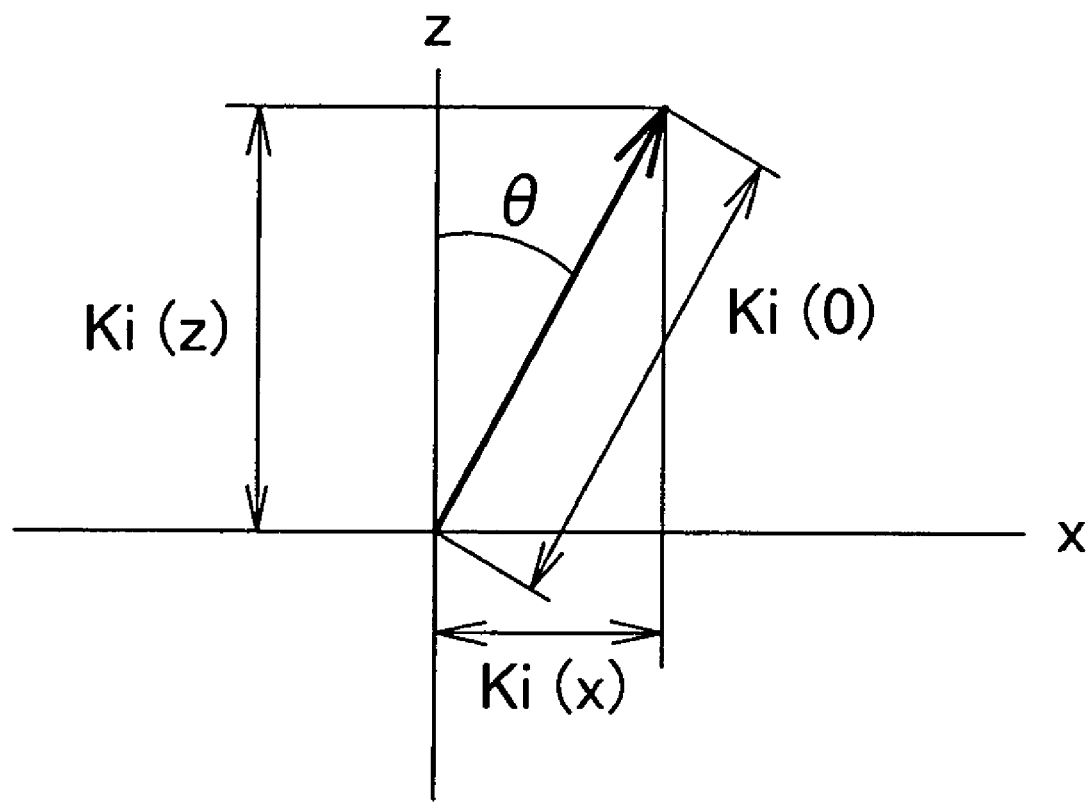
FIG. 13 is a graph illustrating an analysis of an damping characteristic.

FIG. 13 is a graph required for analyzing the damping property, in which a horizontal axis x corresponds to a longitudinal direction and a vertical axis z corresponds to a vertical direction. $\theta$ is an inclination angle, $Ki(0)$ is a loss spring in a direction of a damping axis, $Ki(x)$ is a loss spring in a longitudinal direction, and $Ki(z)$ is a loss spring in a vertical direction.

As is apparent from the drawing, a formula $Ki(x)=Ki(0) \times \sin\theta$ is established.

On the contrary, when an amplitude in the direction of the damping axis is set to $L(0)$, and an amplitude in the longitudinal direction is set to $L(x)$, a formula $L(x)=L(0) \times \sin\theta$ is established in the same manner.

If an amount of attenuation energy in the longitudinal direction is $E(x)$, this $E(x)$ is in proportion to $Ki(x) \times L(x)$. Since the formulas $Ki(x)=Ki(0) \times \sin\theta$, $L(x)=l(0) \times \sin\theta$ are established, the amount of damping energy in the longitudinal direction $E(x)$ is in proportion to $Ki(0) \times \sin\theta \times L(0) \times \sin\theta = E(0) \times \sin^2\theta$.

As a matter of convenience, the amount of damping energy in the longitudinal direction is expressed by the formula $E(x)=E \times \sin^2\theta$.

With respect to the vertical direction, since it is sufficient to change x to z and change $\sin\theta$ to $\cos\theta$, the amount of attenuation energy in the vertical direction can be expressed by the formula $E(z)=E \times \cos^2\theta$.

Figure 14:
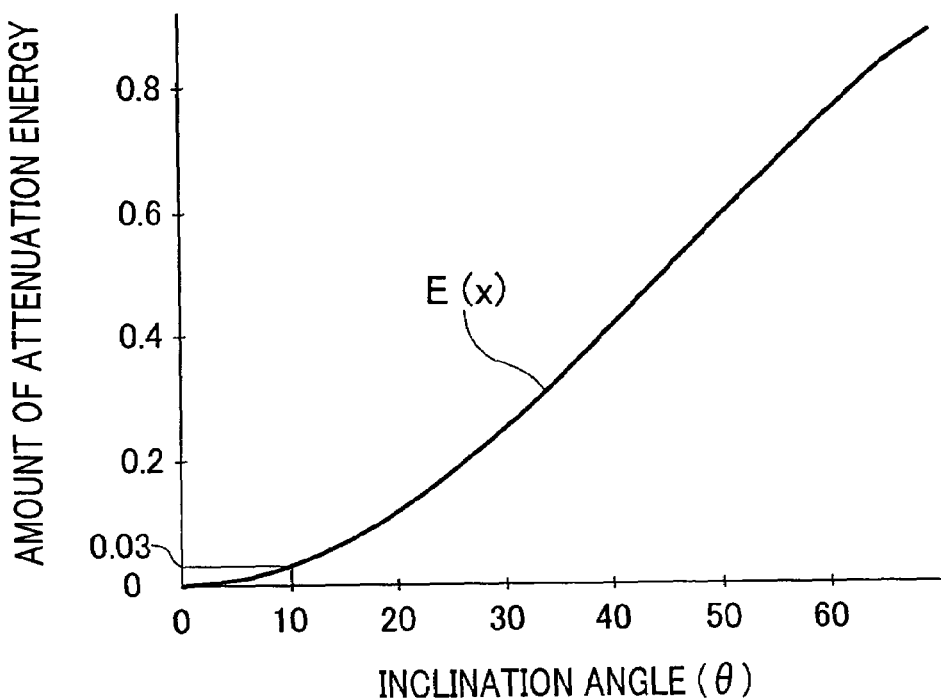
FIG. 14 is a graph showing a seventh embodiment according to the present invention.
Figure 15:
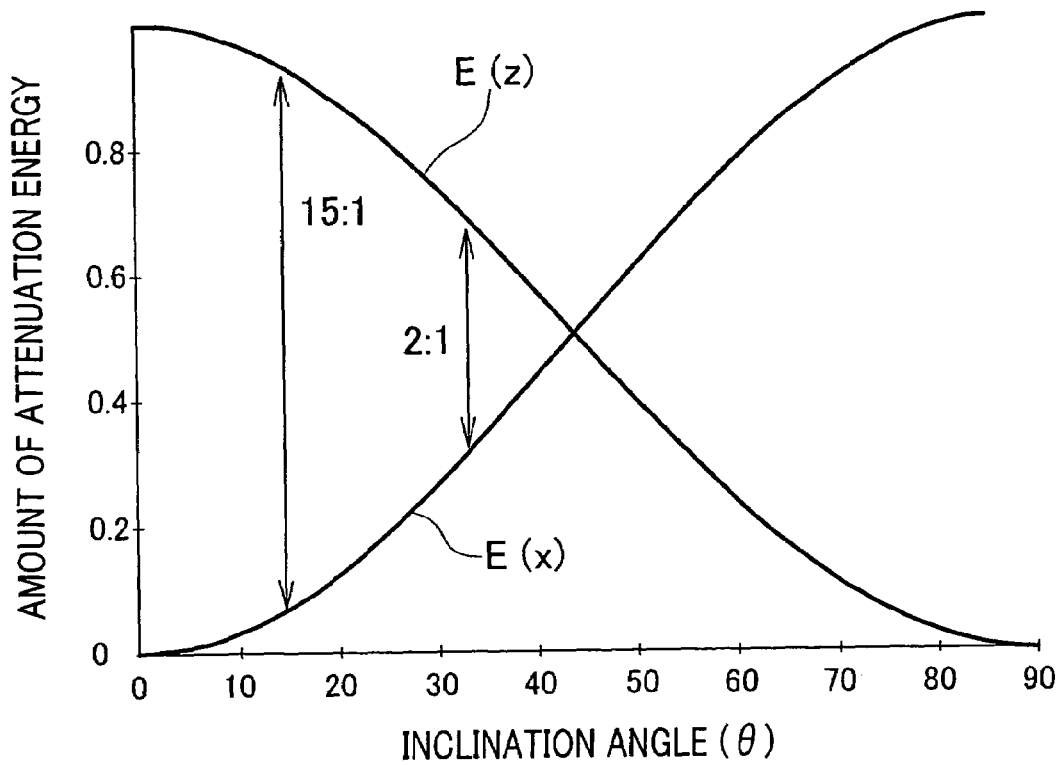
FIG. 15 is a graph illustrating an eighth embodiment according to the present invention.

Reference is now made to the graph of FIG. 14 illustrating a seventh embodiment according to the present invention, in which a horizontal axis indicates $\theta$, and a vertical axis indicates an amount of damping energy. A curve $E(x)$ is obtained by the formula $E(x)=E \times \sin^2\theta$.

Since the engine mount is provided for basically attenuating the vertical vibration, a main operation is a vertical vibration attenuation and a sub operation is a longitudinal vibration attenuation, even in the inclined hydro mount 20.

Experientially, it is desired to secure the longitudinal vibration attenuation of 3.0%. Since 0.03 in the vertical axis corresponds to 3.0%, $\theta=10$ degrees becomes a lower limit by replaying by an inclination angle $\theta$.

Then, according to the seventh embodiment, the inclined hydro mount is characterized in that the inclined hydro mount is inclined along the vehicle longitudinal axis, and the inclination angle is not less than 10 degrees.

A magnitude of the inclination angle determines a magnitude of the attenuation performance in the longitudinal direction of the inclined hydro mount. When the inclination angle is below 10 degrees, the attenuation performance in the longitudinal direction becomes excessively small. Accordingly, it is necessary that the inclination angle is set to be equal to or more than 10 degrees.

Now, reference is made to the graph of FIG. illustrating an eighth embodiment according to the present invention, in which a horizontal axis indicates $\theta$, and a vertical axis indicates an amount of damping energy. An upward-sloping curve is obtained by the formula $E(x)=E \times \sin^2\theta$, and a downward-sloping curve is obtained by the formula $E(z)=E \times \cos^2\theta$.

When the vehicle travels on an ungulate road surface, a relation between a vertical acceleration of the vehicle body and a longitudinal acceleration is changed in accordance with a road surface shape and a specification of the suspension. However, on the basis of the research of the inventors, a rate between the vertical acceleration and the longitudinal acceleration is properly within a range between 15:1 and 2:1.

In the rate 2:1, numeral 1 is a longitudinal component, and the vertical component can not be reduced any more. This is because the engine mount is originally structured such as to attenuate the vertical vibration.

The rate 15:1 corresponds to the inclination angle 15 degrees, and the rate 2:1 corresponds to the inclination angle 35 degrees.

That is, the eighth embodiment is characterized in that the inclination angle is within the range between 15 degrees and 35 degrees.

If the inclination angle is equal to or more than 15 degrees, the attenuation performance in the longitudinal direction is further increased. However, the attenuation performance in the vertical direction is reduced in accordance with the increased of the attenuation performance in the longitudinal direction. Accordingly, the upper limit of the inclination angle is set to 35 degrees.

Figure 16:
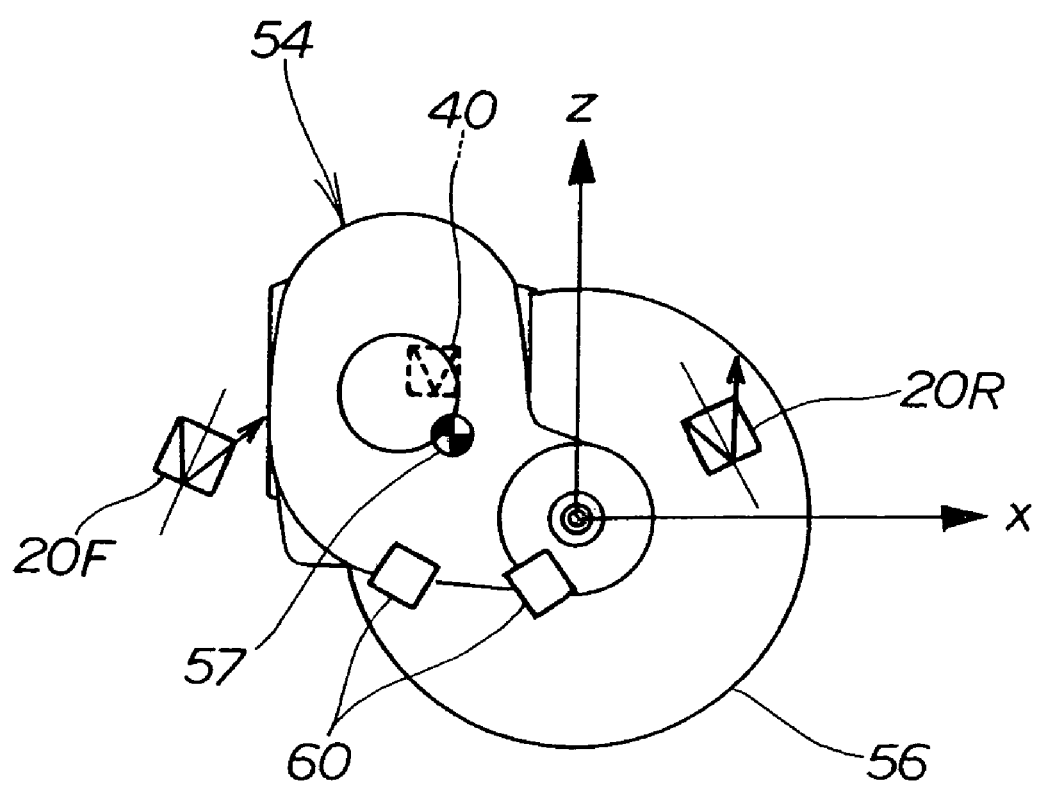
FIG. 16 is a schematic view of a ninth embodiment according to the present invention.
Figure 17:
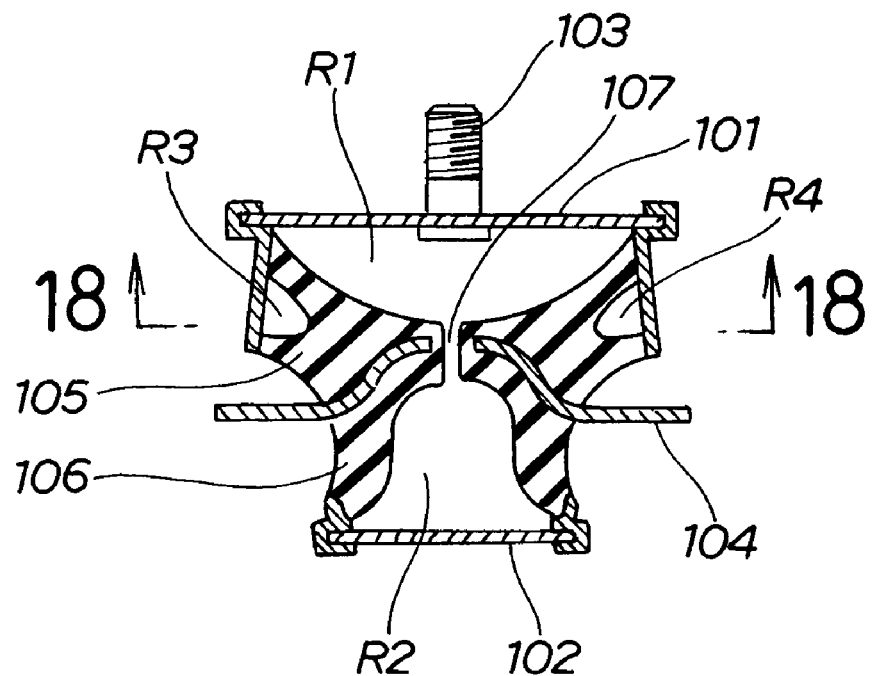
FIG. 17 is a cross-sectional view illustrating a conventional hydro mount.
Figure 18:
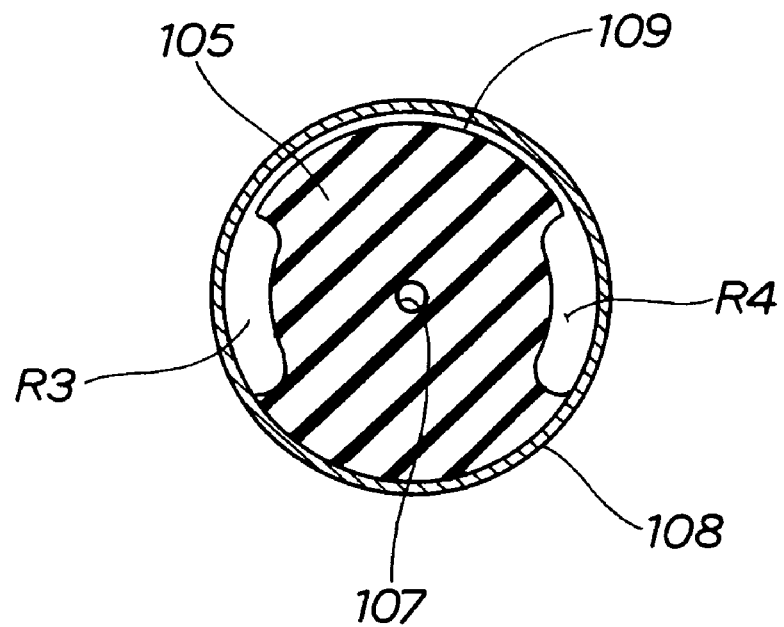
FIG. 18 is a cross sectional view taken along line 18—18 of FIG. 17.

FIG. 16 is a schematic view of a ninth embodiment according to the present invention. The inclined hydro mounts 20F and 20R are arranged in the front and rear sides of the power plant 54.

The inclined hydro mounts 20F and 20R are arranged for attenuating the longitudinal vibration in addition to the vertical vibration. Accordingly, at least one of the inclined hydro mounts 20F and 20R is desirably structured such that the damping peak frequency of the attenuation characteristic is made similar to the longitudinal resonance frequency of the power plant with transversal engine. The inclined hydro mount 20F or 20R is set such that the damping peak frequency aligns with the frequency in the range of 0.6 L to 1.5 L, preferably in the range of 0.7 L to 1.3 L at a time when the longitudinal resonance frequency of the power plant with transversal engine is L.

That is, the ninth embodiment is characterized in that in the case that the component along the vehicle longitudinal axis in the resonance frequency of the power plant is called as the longitudinal resonance frequency, the peak frequency of at least one inclined hydro mount is set to be near the longitudinal resonance frequency of the power plant.

The vibrations in the various kinds of frequency bands are applied to the engine mount. Among them, the longitudinal resonance frequency of the power plant is the most important frequency, and it is effective in view of inhibiting the engine from oscillating in the longitudinal direction and inhibiting the vehicle body from vibrating in the longitudinal direction as a result to provide at least one inclined hydro mount in correspondence to the longitudinal resonance frequency mentioned above.

Further, the inventors of the present application found that in the case of arranging the front and rear inclined hydro mounts 20F and 20R as illustrated, for example, the damping peak frequency of the rear inclined hydro mount 20R is set to be near the longitudinal resonance frequency of the power plant, however, the front inclined hydro mount 20F can bring out a new effect in accordance with another setting.

Among the various kinds of vibrations applied to the engine mount, the non-suspended longitudinal resonance frequency applied from the tire wheel through the suspension becomes important. The non-suspended longitudinal resonance frequency is recognized to be 2 to 15 Hz higher than the longitudinal resonance frequency of the power plant as a result of being measured actually in the vehicle which is put to practical use. Accordingly, the damping peak frequency of the front inclined hydro mount 20F is set to be at least 2 Hz higher than the rear inclined hydro mount 20R.

That is, according to the tenth embodiment, the inclined hydro mount is characterized in that a plurality of inclined hydro mounts are provided, the peak frequency of the first inclined hydro mount is set to be near the longitudinal resonance frequency of the power plant, and the peak frequency of the second inclined hydro mount is at least 2 Hz higher than the first inclined hydro mount.

In this case, although the inclined hydro mount 20 is based on the structure described in FIGS. 2A and 2B, the inclined hydro mount 20 can be substituted by inclining wholly at an angle θ the vertical type hydro mount 40 described in FIG. 3.

However, since the bolt 49 is inclined by inclining the vertical type hydro mount 40 wholly at the angle θ, it is necessary to form an inclined surface in the side of the engine so as to provide a inclined bolt hole, whereby a cost of the engine is increased. In accordance with the structure in FIG. 2, the inclined hydro mount 20 causes a slight cost increase, but the engine side can be kept in the conventional structure.

Obviously, various minor changes and modifications of the present invention are possible in the light of the above teaching. It is therefore to be understood that within the scope of the appended claims the invention may be practiced otherwise than as specifically described.

What is claimed is:

1. A support structure for supporting, via an engine mount, a transversal engine having a crankshaft laid horizontally at a right angle to a vehicle longitudinal axis, on a vehicle body,
   wherein said engine mount includes at least one inclined hydro mount in which a working fluid is enclosed and a maximum damping generating axis is inclined a predetermined angle with respect to a vertical line, and the inclined hydro mount is disposed inwardly of a total width in a power plant which includes the transversal engine and a transmission.

2. A support structure for a transversal engine, according to claim 1, wherein said inclined hydro mount is arranged at substantially the same height as a center of mass of said power plant.

3. A support structure for a transversal engine, according to claim 1, wherein said at least one inclined hydro mount is plural, and an average value of heights of the inclined hydro mounts is substantially the same height as the height of the center of mass of said power plant.

4. A support structure for a transversal engine, according to claim 1 or 2, wherein said inclined hydro mount is arranged on or near the vehicle longitudinal axis passing through the center of mass of said power plant as viewed in top plan.

5. A support structure for a transversal engine, according to claim 3, wherein said inclined hydro mounts are arranged on right and left sides of the vehicle longitudinal axis passing through the center of mass of said power plant in a plan view, and a distance between the vehicle longitudinal axis, and the left hydro mount is set to be substantially equal to a distance between the vehicle longitudinal axis and the right hydro mount.

6. A support structure for a transversal engine, according to claim 3 or 5, wherein said inclined hydro mounts are arranged on front and rear sides of a vehicle cross axis passing through the center of mass of said power plant as viewed in side elevation, and the front and rear inclined hydro mounts are arranged such that a maximum damping generating axis forms a V shape or an inverted-V shape.

7. A support structure for a transversal engine, according to any one of claims 1 to 3, wherein said inclined hydro mount is inclined along the vehicle longitudinal axis, and an inclination angle is not less than 10 degrees.

8. A support structure for a transversal engine, according to claim 7, wherein said inclination angle is in a range between 15 degrees and 35 degrees.

9. A support structure for a transversal engine, according to any one of claims 1 or 2, wherein, when a component along the vehicle longitudinal axis in a resonance frequency of the engine is called as a longitudinal resonance frequency of the power plant, a damping peak frequency of said at least one inclined hydro mount is set near the longitudinal resonance frequency of the power plant.

10. A support structure for a transversal engine, according to claim 3 or 5, wherein said at least one inclined hydro mount is constituted by a plurality of inclined hydro mounts, a damping peak frequency of a first inclined hydro mount is set to be near the longitudinal resonance frequency of the power plant, and a damping peak frequency of a second inclined hydro mount is set to be at least 2 Hz higher than said first inclined hydro mount.

* * * * *